US012438653B2

(12) United States Patent
Persson et al.

(10) Patent No.: US 12,438,653 B2
(45) Date of Patent: Oct. 7, 2025

(54) ACCESS NODE, USER EQUIPMENT AND METHODS IN A WIRELESS COMMUNICATIONS NETWORK

(71) Applicant: Telefonaktiebolaget LM Ericsson (publ), Stockholm (SE)

(72) Inventors: Claes-Göran Persson, Mjölby (SE); Paul Schliwa-Bertling, Ljungsbro (SE); Johan Rune, Lidingö (SE); Pontus Wallentin, Linköping (SE); Pradeepa Ramachandra, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 713 days.

(21) Appl. No.: 17/288,706

(22) PCT Filed: Oct. 29, 2019

(86) PCT No.: PCT/SE2019/051074
§ 371 (c)(1),
(2) Date: Apr. 26, 2021

(87) PCT Pub. No.: WO2020/091670
PCT Pub. Date: May 7, 2020

(65) Prior Publication Data
US 2021/0410027 A1 Dec. 30, 2021

Related U.S. Application Data

(60) Provisional application No. 62/753,980, filed on Nov. 1, 2018.

(51) Int. Cl.
*H04L 1/1867* (2023.01)
*H04W 36/00* (2009.01)
*H04W 36/18* (2009.01)

(52) U.S. Cl.
CPC ....... *H04L 1/1896* (2013.01); *H04W 36/0058* (2018.08); *H04W 36/185* (2023.05)

(58) Field of Classification Search
CPC ....... H04W 36/00837; H04W 36/0058; H04W 36/18; H04L 1/1896
See application file for complete search history.

(56) References Cited

U.S. PATENT DOCUMENTS 8,358,982 B2 * 1/2013 Van Der Velde ............. H04W 36/0088
455/67.11
2014/0073306 A1 * 3/2014 Shetty ............... H04W 36/0088
455/418

(Continued)

FOREIGN PATENT DOCUMENTS

| WO | 2011019308 A1 | 2/2011 |
| WO | 2017138978 A1 | 8/2017 |
| WO | 2018142308 A1 | 8/2018 |

OTHER PUBLICATIONS

International Search Report and Written Opinion dated Jan. 8, 2020 for International Application No. PCT/SE2019/051074 filed Oct. 29, 2019, consisting of 16-pages.

(Continued)

*Primary Examiner* — Siming Liu
(74) *Attorney, Agent, or Firm* — Weisberg I.P. Law, P.A.

(57) ABSTRACT

A method performed by a source access node for performing data forwarding at handover of a UE from a source cell to a target cell in a wireless communications network is provided. When a criterion for data forwarding is fulfilled, the source access node obtains a trigger for downlink data forwarding. When receiving the trigger, the source access node initiates downlink data forwarding to the UE via the target access node.

6 Claims, 23 Drawing Sheets

(56) References Cited

U.S. PATENT DOCUMENTS

| | | | | |
|---|---|---|---|---|
| 2015/0382395 | A1* | 12/2015 | Yang | H04L 1/00 370/216 |
| 2019/0166528 | A1* | 5/2019 | Zhang | H04W 36/026 |
| 2019/0357097 | A1* | 11/2019 | Rugeland | H04W 56/001 |

OTHER PUBLICATIONS

3GPP TS 36.300 V14.1.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), Dec. 2016, consisting of 317-pages.

3GPP TR 36.881 V14.0.0; 3rd Generation Partnership Project; Technical Specification Group Radio Access Network; Evolved Universal Terrestrial Radio Access (E-UTRA); Study on latency reduction techniques for LTE (Release 14), Jun. 2016, consisting of 100-pages.

3GPP TS 38.300 V15.3.1; 3rd Generation Partnership Project; Technical Specification Group Radio Access Network; NR; NR and NG-RAN Overall Description; Stage 2 (Release 15), Oct. 2018, consisting of 92-pages.

3GPP TS 38.331 V15.3.0; 3rd Generation Partnership Project; Technical Specification Group Radio Access Network; NR; Radio Resource Control (RRC) protocol specification (Release 15), Sep. 2018, consisting of 445-pages.

3GPP TS 36.331 V14.4.0; 3rd Generation Partnership Project; Technical Specification Group Radio Access Network; Evolved Universal Terrestrial Radio Access (E-UTRA) ; Radio Resource Control (RRC); Protocol specification (Release 14), Sep. 2017, consisting of 753-pages.

* cited by examiner

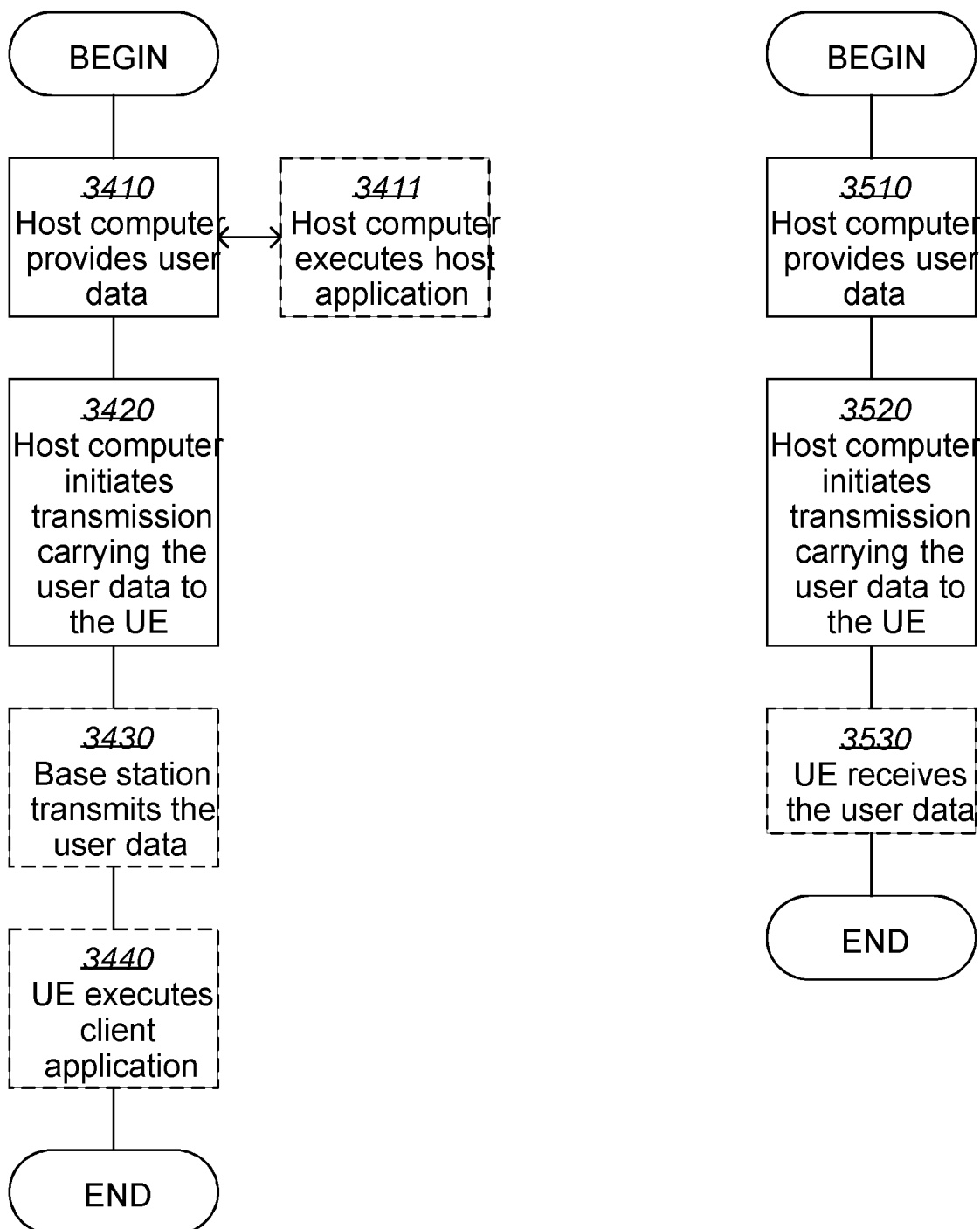

ACCESS NODE, USER EQUIPMENT AND METHODS IN A WIRELESS COMMUNICATIONS NETWORK

CROSS-REFERENCE TO RELATED APPLICATIONS

This application is a Submission Under 35 U.S.C. § 371 for U.S. National Stage Patent Application of International Application No.: PCT/SE2019/051074, filed Oct. 29, 2019 entitled "TRIGGER DATA FORWARDING BETWEEN A SOURCE ACCESS NODE AND A TARGET ACCESS NODE," which claims priority to U.S. Provisional Application No. 62/753,980, filed Nov. 1, 2018, entitled "ACCESS NODE, USER EQUIPMENT AND METHODS IN A WIRELESS COMMUNICATIONS NETWORK" the entireties of both of which are incorporated herein by reference.

TECHNICAL FIELD

Embodiments herein relate to an access node, a user equipment and methods therein. In particular, they relate to performing data forwarding at handover of the UE from a source cell to a target cell in a wireless communications network.

BACKGROUND

In a typical wireless communication network, wireless devices, also known as wireless communication devices, mobile stations, stations (STA) and/or User Equipments (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio access node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio access node. The radio access node communicates over an air interface operating on radio frequencies with the wireless device within range of the radio access node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio access nodes are directly connected to the EPC core network rather than to RNCs used in 3G networks. In general, in E-UTRAN/LTE the functions of a 3G RNC are distributed between the radio access nodes, e.g. eNodeBs in LTE, and the core network. As such, the RAN of an EPS has an essentially "flat" architecture comprising radio access nodes connected directly to one or more core networks, i.e. they are not connected to RNCs. To compensate for that, the E-UTRAN specification defines a direct interface between the radio access nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Wireless Communication Systems in 3GPP

Consider the simplified wireless communication system illustrated in FIG. 1, with a UE 120, which communicates with one or multiple access nodes 103-104, which in turn is connected to a access node 106. The access nodes 103-104 are part of the radio access network 10.

For wireless communication systems pursuant to 3GPP Evolved Packet System, EPS, also referred to as Long Term Evolution, LTE, or 4G, standard specifications, such as specified in 3GPP TS 36.300 and related specifications, the access nodes 103-104 corresponds typically to an Evolved NodeB (eNB) and the access node 106 corresponds typically to either a Mobility Management Entity (MME) and/or a Serving Gateway (SGVV). The eNB is part of the radio access network 100, which in this case is the E-UTRAN (Evolved Universal Terrestrial Radio Access Network), while the MME and SGW are both part of the EPC (Evolved Packet Core network).

For wireless communication systems pursuant to 3GPP 5G System, 5GS (also referred to as New Radio, NR, or 5G) standard specifications, such as specified in 3GPP TS 38.300 and related specifications, on the other hand, the access nodes 103-104 corresponds typically to an 5G NodeB (gNB) and the access node 106 corresponds typically to either a Access and Mobility Management Function (AMF) and/or a User Plane Function (UPF). The gNB is part of the radio access network 10, which in this case is the NG-RAN (Next Generation Radio Access Network), while the AMF and UPF are both part of the 5G Core Network (5GC).

Mobility in RRC_CONNECTED in LTE and NR

A UE in RRC_CONNECTED state may be configured by the network to perform measurements of serving and neighbor cells and based on the measurement reports sent by the UE, the network may decide to perform a handover of the UE to a neighbor cell. The network then sends a Handover Command message to the UE (in LTE an RRCConnectionReconfiguration message with a field called mobilityControlInformation and in NR an RRCReconfiguration message with a reconfigurationWithSync field).

The reconfiguration of the UE is prepared by the target access node upon a request from the source access node (Handover Request message sent over X2 interface in case of EUTRA-EPC or Xn interface in case of EUTRA-5GC or NR) and takes into account the existing RRC configuration the UE has in the source cell (which is provided to the target access node in the Handover Request message). The reconfiguration parameters provided by the target access node (such as a target eNB/gNB), contains, for example, information needed by the UE to access the target cell, e.g., random access configuration, a new C-RNTI assigned by the target access node and security parameters enabling the UE to calculate new security keys associated to the target cell so that the UE can send a Handover Complete message on SRB1 (encrypted and integrity protected) based on new security keys upon accessing the target access node.

FIGS. 2 a, b and c summarize the signalling flow between the UE 102, the source access node 103 (also known as source gNB or source cell) and the target access node 104

(also known as target gNB or target cell) during a handover procedure, using 5G/NR as example. FIG. 2a depicts the of the handover preparation a handover procedure, FIG. 2b depicts the handover execution of the a handover procedure, and FIG. 2c depicts the handover completion of the a handover procedure, Although the signaling flow in FIGS. 2 a, b and c show a handover scenario in 5G/NR, there are some general and common principles for UEs performing handover (or in more general terms, mobility in RRC_CONNECTED) in LTE and NR:

- Mobility in RRC_CONNECTED is Network-controlled as the network has best info regarding current situation such as load conditions, resources in different nodes, available frequencies, etc. Network may also take into account the impact from other UEs served by the network, e.g. from a resource allocation perspective. The AMF (Access and Mobility management Function) may provide the access nodes (such as eNBs and gNBs) with mobility-control information, as in step 0 in FIG. 2.
- The Network prepares a target access node 104 before the UE accesses that node. The source access node 103 provides the UE with the RRC configuration to be used in the target access node 104, including SRB1 configuration to be used when the UE sends the HO Complete message (also known as the RRCConnectionReconfigurationComplete message in LTE) in the target access node 104.
- A new C-RNTI is allocated by the target access node 104 and provided to the UE in the Handover Command message. The UE identifies itself by conveying the C-RNTI in MSG3 in the HO Complete message. Hence, there is no need for UE context fetching in the target node, unless a failure occurs.
- To speed up the handover, source access node 103 provides the UE with information how to access the target access node 104 e.g. RACH configuration, so the UE does not have to acquire SI prior to the handover.
- The UE may be provided with contention-free random access (CFRA) resources, i.e. in that case the target access node 104 identifies the UE from the preamble in MSG1. The principle is that the handover procedure can always be optimized with network pre-allocated resources.
- Security is prepared before the UE accesses the target access node 104 i.e. keys must be refreshed before sending the encrypted and integrity protected HO Complete message so UE can be verified to the target access node 104.
- Both full and delta reconfiguration are supported so that the HO command can be minimized.

Mobility Enhancements for LTE and NR and Make-Before-Break (MBB)

Two new work items for mobility enhancements in LTE and NR have started in 3GPP in release 16. The main objectives of the work items are to improve the robustness at handover and to decrease the interruption time at handover.

Handover interruption time is typically defined as the time from the UE stops transmission/reception with the source access node 103 (eNB/gNB) until the target access node 104 (eNB/gNB) resumes transmission/reception with the UE.

In LTE pre-Rel-14, according to 3GPP TR 36.881, the handover interruption time is at least 45 ms. In LTE and NR, different solutions to decrease the handover interruption time have since then been discussed. Improvements are driven for example by new service requirements on low latency (e.g. aerial, industrial automation, industrial control) for which low interruption time shall be guaranteed.

As an example of one such improvement, Make-Before-Break (MBB) was introduced in LTE Rel-14 in purpose to shorten handover interruption time as close to 0 ms as possible. Please see FIG. 3.

MBB as specified in LTE Rel-14 (3GPP TS 36.300 and TS 36.331) has some known limitations:

- The connection to the source access node 103 is only maintained until the UE executes initial uplink transmission in the target access node 104, i.e. the UE releases the connection to the source cell before the connection to the target access node is ready for packet transmission/reception (see blue arrows in FIG. 3).
- 3GPP TS 36.300 and TS 36.331 do not clearly specify when UE can switch from Source access node 103 to Target access node 104 for DL/UL data transfer.
- It is designed for UEs with single Tx/Rx radio chain. Such a UE can typically not maintain simultaneous DL/UL data transfer with Source access node and at the same time switch from Source access node 103 to Target access node 104 without any user plane interruption.
- There is no clear mechanism defined for how long Source access node 103 will continue to transfer DL data during HO execution. In worst case the Source access node 103 will continue to transfer DL data to the UE until it receives the UE Context Release message in step 17 in FIG. 3.
- How DL Data transfer can be handled without interruption (& reliably) during PDCP Anchor switch from Source access node 103 to Target access node 104 is not specified.
- HO reliability & robustness enhancements are not considered.
- It is limited to intra-frequency, synchronous and same bandwidth carrier frequency for both source access node 103 and target access node 104.

Improvements to the LTE Rel-14 make-before-break handover have been proposed in the past, Some of these improvements would benefit from UEs with dual Tx/Rx radio chain (such a UE has dual radio transmitters and receivers and associated dual user plane protocol stacks). One example of such proposed improvement is shown in FIGS. 4 a and 4b. FIG. 4a depicts handover preparation and a part of handover execution of the handover process. FIG. 4b depicts continuation of the handover execution and handover completion of the handover process.

In FIG. 4a, Reference 401 depicts parallel DL/UL Data Transfer with SeNB and HO execution using 2nd L1/L2 stack. Reference 402 depicts HO preparation, and reference 403 depicts HO execution.

In FIG. 4b, Reference 404 depicts HO execution, and reference 405 depicts HO completion.

Some highlights in this solution are:

- At step 7 upon receiving the 'make-before-break' HO indication in the RRC Connection Reconfiguration Request message, UE maintains the connection to the source cell 103 even while establishing the connection to the target access node 104. That is, the UE can send and receive data via the source access node 103 between step 7-10 without any interruption. And after step 10, UE has the target link available for data Tx/Rx similar to the regular HO procedure.
- Once the connection setup with the target access node is successful, i.e. after sending the RRC Connection Reconfiguration Complete message in step 10, UE maintains one common PDCP entity but keeps dual RLC/MAC/PHY stacks, one for the source access node 103 link and one for the target access node 104 link. After step 10, UE transmits the UL data on the target access node 103 similar to the regular HO procedures using the target access node 104 security keys. There is no need for UL data duplication to both nodes and it avoids UE Power splitting between 2 nodes and also simplifies UE implementation.

After UE sends the RRC Connection Reconfiguration Complete message, Target access node 104 will send X2 data forwarding indication (step 11) to source access node 103 and Source access node PDCP PDUs will be duplicated towards Target access node 104 (via X2 UP). Target access node PDCP will encrypt data received from Source access node 103. UE can then receive DL data from both the source and target access nodes simultaneously before source access node 103 connection is released. Optionally (based on network implementation) duplicating DL data transmission (i.e. sending the same PDCP PDUs from both nodes) during HO execution provides helps to reduce DL data interruption during HO execution (also helpful for additional link reliability and reduces latency of DL data delivery i.e. when one link is poor and without waiting for re-transmission delay, the other link can deliver the same data faster without re-transmission).

The UE needs to maintain the security context for both source access node 103 and target access node 104 until the source access node release request is received. UE can differentiate the security key to be used for a PDCP PDU based on the RLC/MAC/PHY stack from which the PDU is received.

UE releases the source access node connection as per the notification from the target access node 104 (step 17a).

SUMMARY

An object of embodiments herein is to improve the performance of a wireless communications network using handover.

According to an aspect of embodiments herein, the object is achieved by a method performed by an access node for performing data forwarding at handover of a UE from a source cell to a target cell in a wireless communications network. When a criterion for data forwarding is fulfilled, the source access node obtains a trigger for downlink data forwarding. When receiving the trigger, the source access node initiates downlink data forwarding to the UE via the target access node.

According to another aspect of embodiments herein, the object is achieved by a method performed by a User Equipment, UE, for handling a handover of from a source cell to a target cell in a wireless communications network. The UE detects that a criterion for data forwarding is fulfilled. The UE transmits a trigger to the source access node upon detecting that the criterion is fulfilled. The trigger triggers the source access node to initiate downlink data forwarding to the UE via the target access node.

According to an aspect of embodiments herein, the object is achieved by an access node configured to perform data forwarding at handover of a UE from a source cell to a target cell in a wireless communications network. The access node is further configured to: When a criterion for data forwarding is fulfilled, obtain a trigger for downlink data forwarding, and when receiving the trigger, initiate downlink data forwarding to the UE via the target access node.

According to another aspect of embodiments herein, the object is achieved by a User Equipment, UE, configured to handle a handover of from a source cell to a target cell in a wireless communications network. The UE is further configured to:

detect that a criterion for data forwarding is fulfilled, and transmit a trigger to the source access node upon detecting that the criterion is fulfilled, which trigger triggers the source access node to initiate downlink data forwarding to the UE via the target access node.

When a criterion for data forwarding is fulfilled, the source access node obtains a trigger for downlink data forwarding. When receiving the trigger, the source access node initiates downlink data forwarding to the UE via the target access node.

Thanks to the trigger obtained that is received when a criterion for data forwarding is fulfilled, the source access node can initiate DL forwarding earlier than prior art solutions. This is since in embodiments herein, the trigger when the criterion for data forwarding is fulfilled is obtained earlier than when the UE has sent the RRC Connection Reconfiguration Complete message, also known as the Handover Complete message, to the target access node.

BRIEF DESCRIPTION OF THE DRAWINGS

Examples of embodiments herein are described in more detail with reference to attached drawings in which:

FIGS. 19-22 are flowcharts illustrating methods implemented in a communication system including a host computer, a base station and a user equipment.

DETAILED DESCRIPTION

As a part of developing embodiments herein the inventors identified a problem which first will be discussed.

Some particular limitations of the existing make-before-break handover solutions, including previously proposed improvements, are:

While some proposed solutions are utilizing UEs with dual Tx/Rx chains, there is no reduction in handover interruption time achieved for UEs with single Tx/Rx chain, compared to LTE Rel-14.

The Rel-14 make-before-break handover solution reduces the interruption time to theoretically 0ms in uplink. However, in the downlink there will be a delay in the DL data transfer since the DL packets starts to be forwarded only after the UE has sent the RRCConnectionReconfigurationComplete message (also known as the Handover Complete message) to the target access node.

The make-before-break handover solutions are susceptible to premature loss of the UE's connection to the source access node 103 in the source cell. If the connection to the source access node is broken before the UE has sent the RRCConnectionReconfigurationComplete message (also known as the Handover Complete message) to the target access node, DL packets are lost.

The same PDCP PDUs may be sent from source access node and target access node during HO execution phase, i.e. the UE need to perform duplication check of received packets.

Thus, there is a need to reduce the delay in DL data transfer.

An object of embodiments herein is to improve the performance of a wireless communications network using handover.

Figure 1:
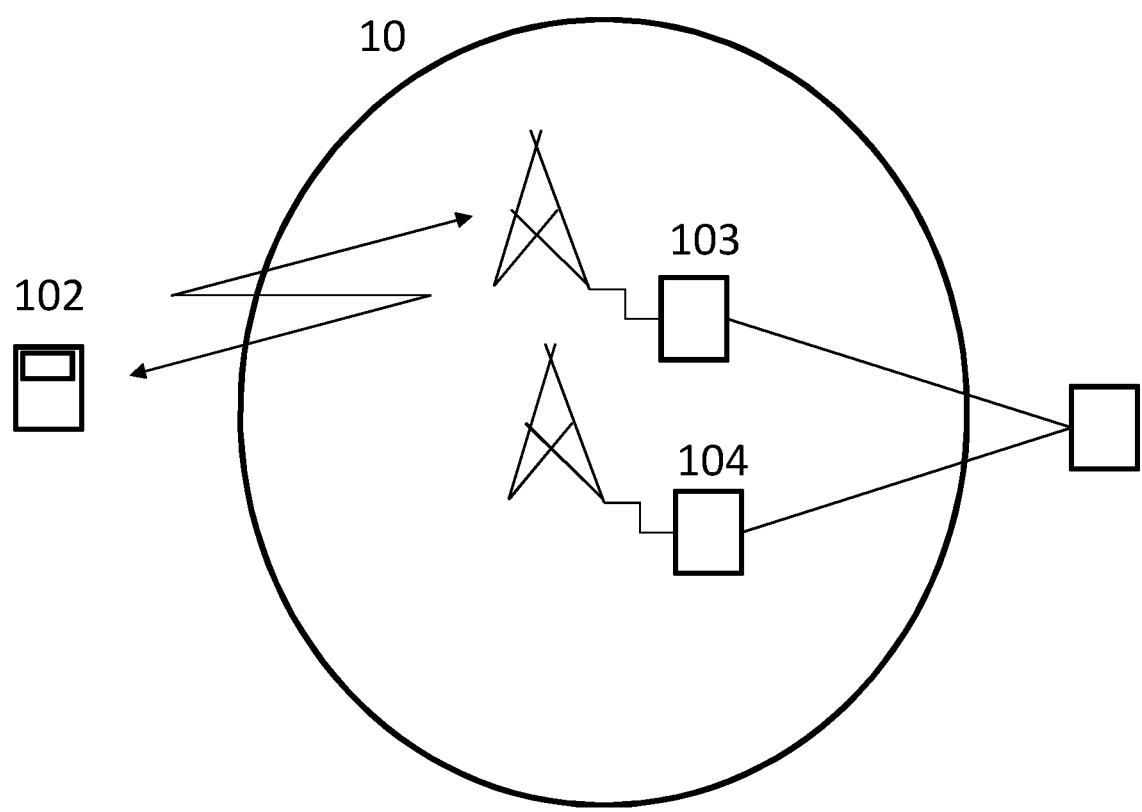
FIG. 1 is a schematic block diagram illustrating prior art.
Figure 2A:
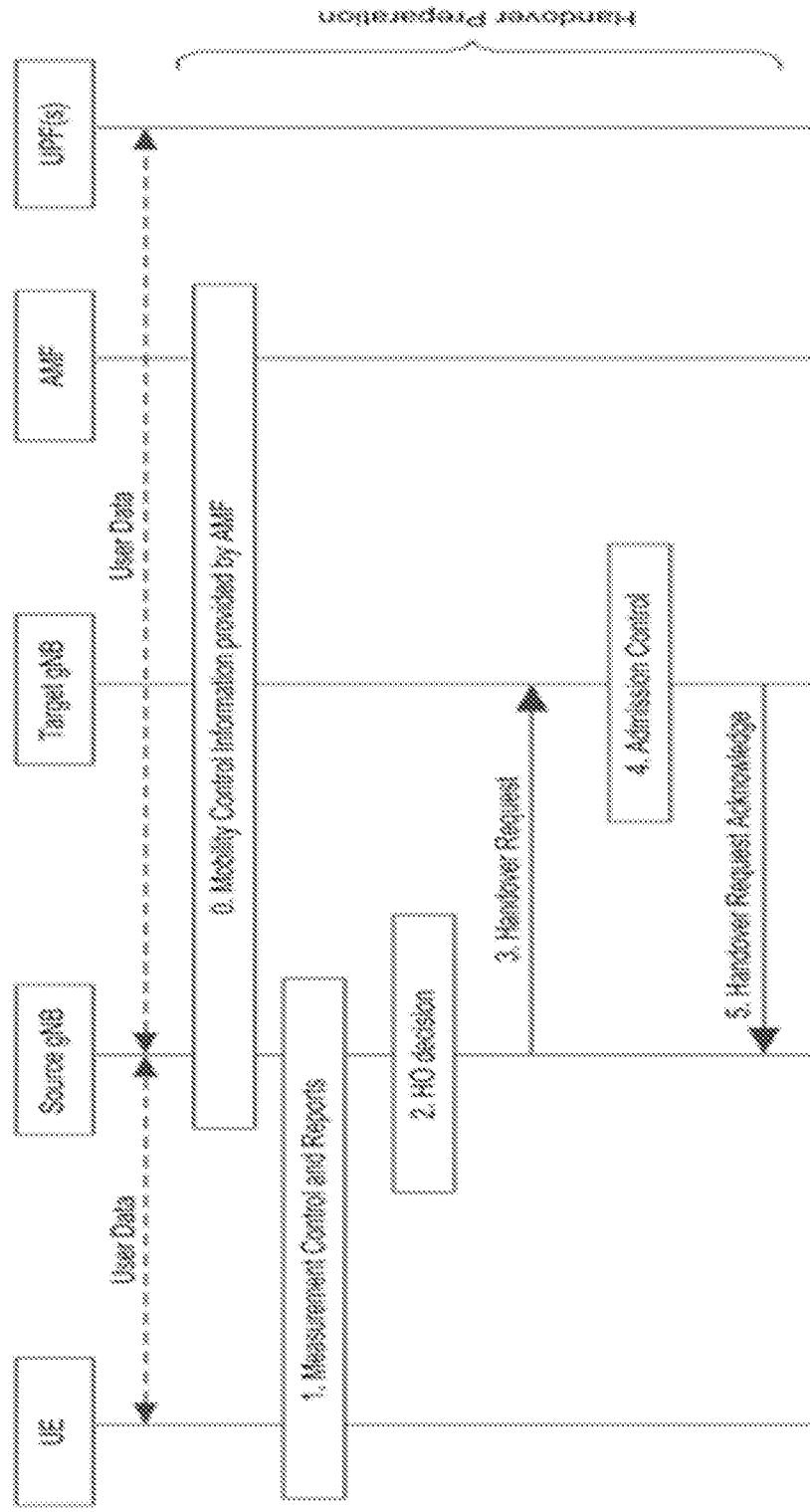
FIGS. 2 *a, b,* and *c* are schematic sequence diagrams illustrating prior art.
Figure 2B:
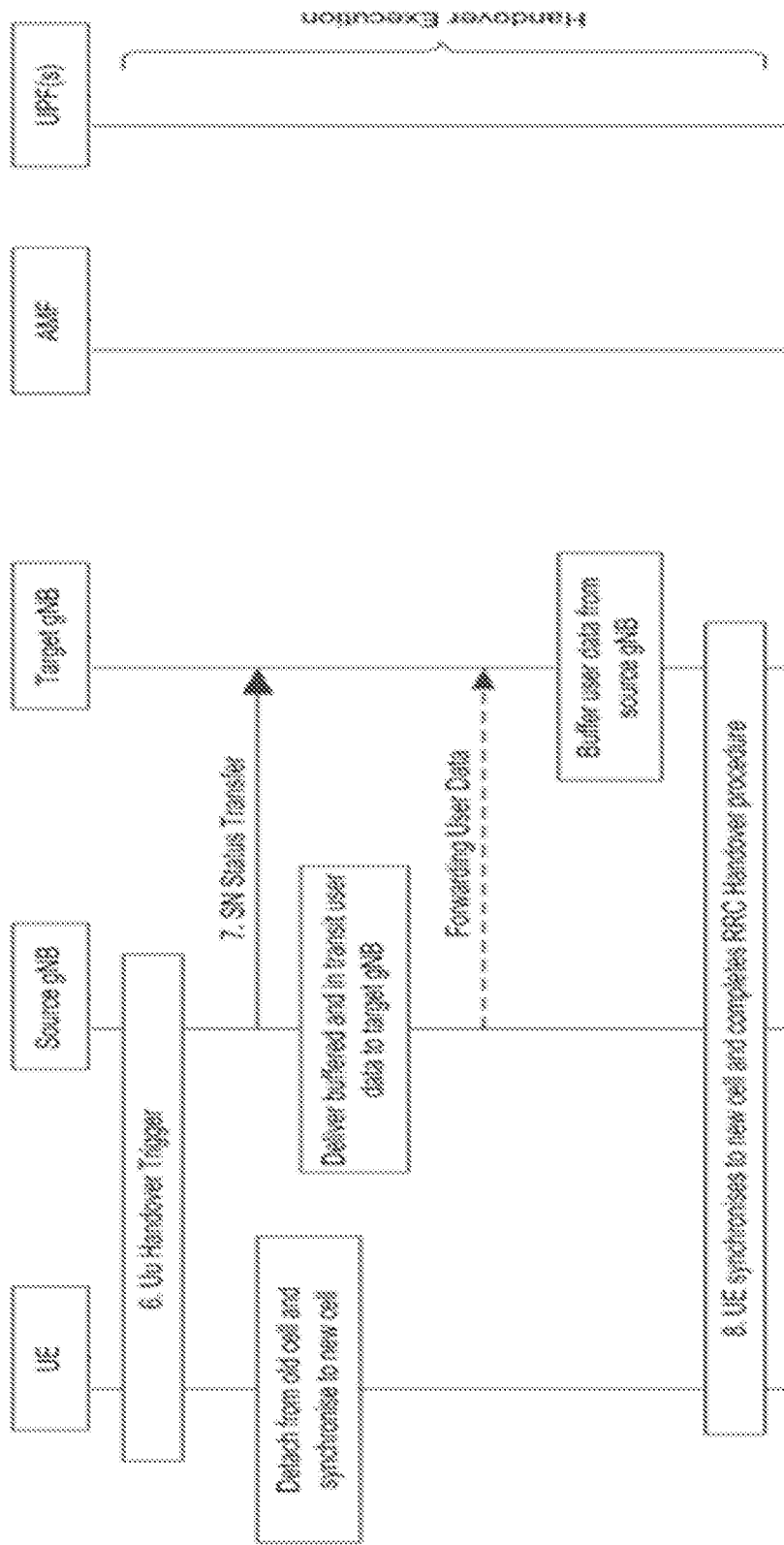
Figure 2C:
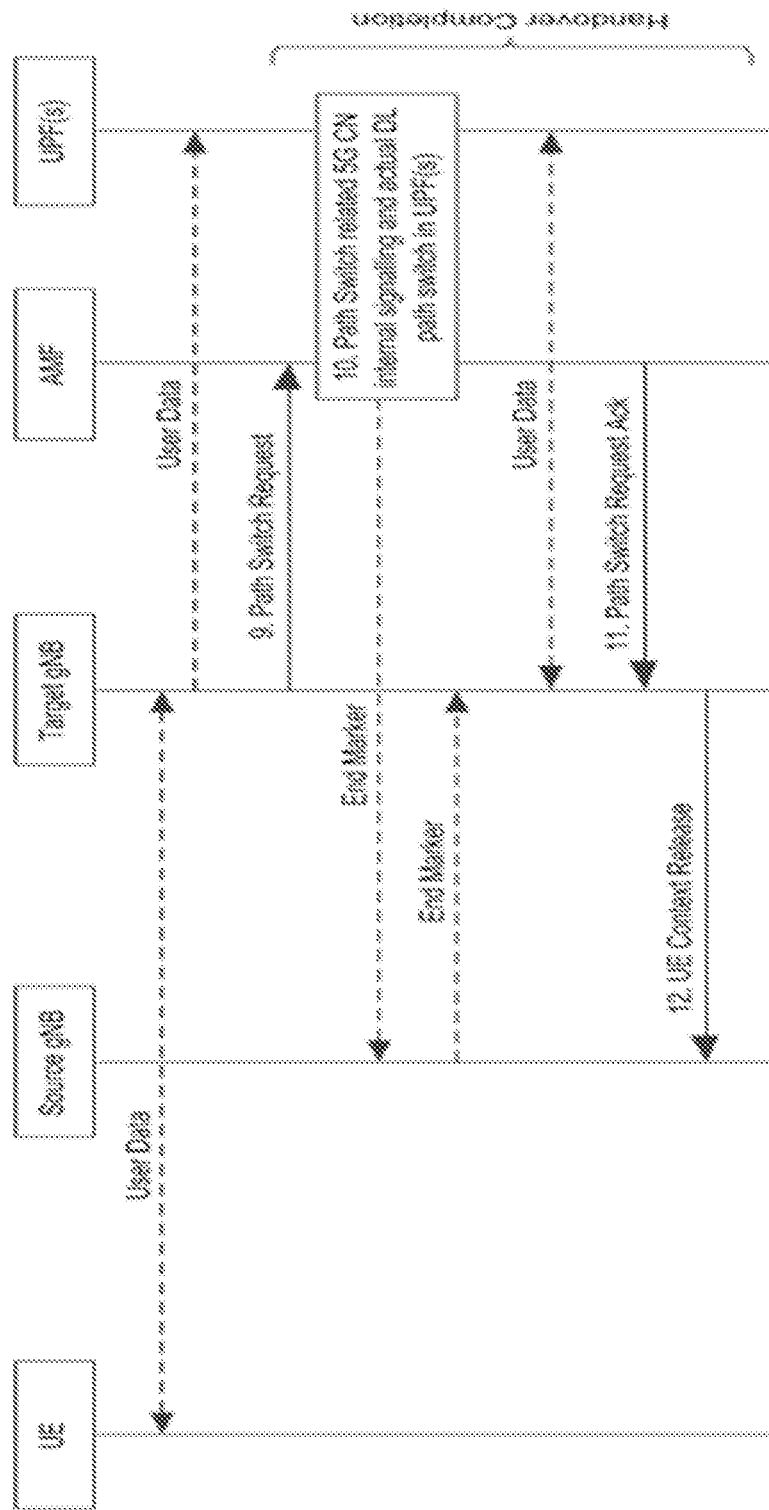
Figure 3:
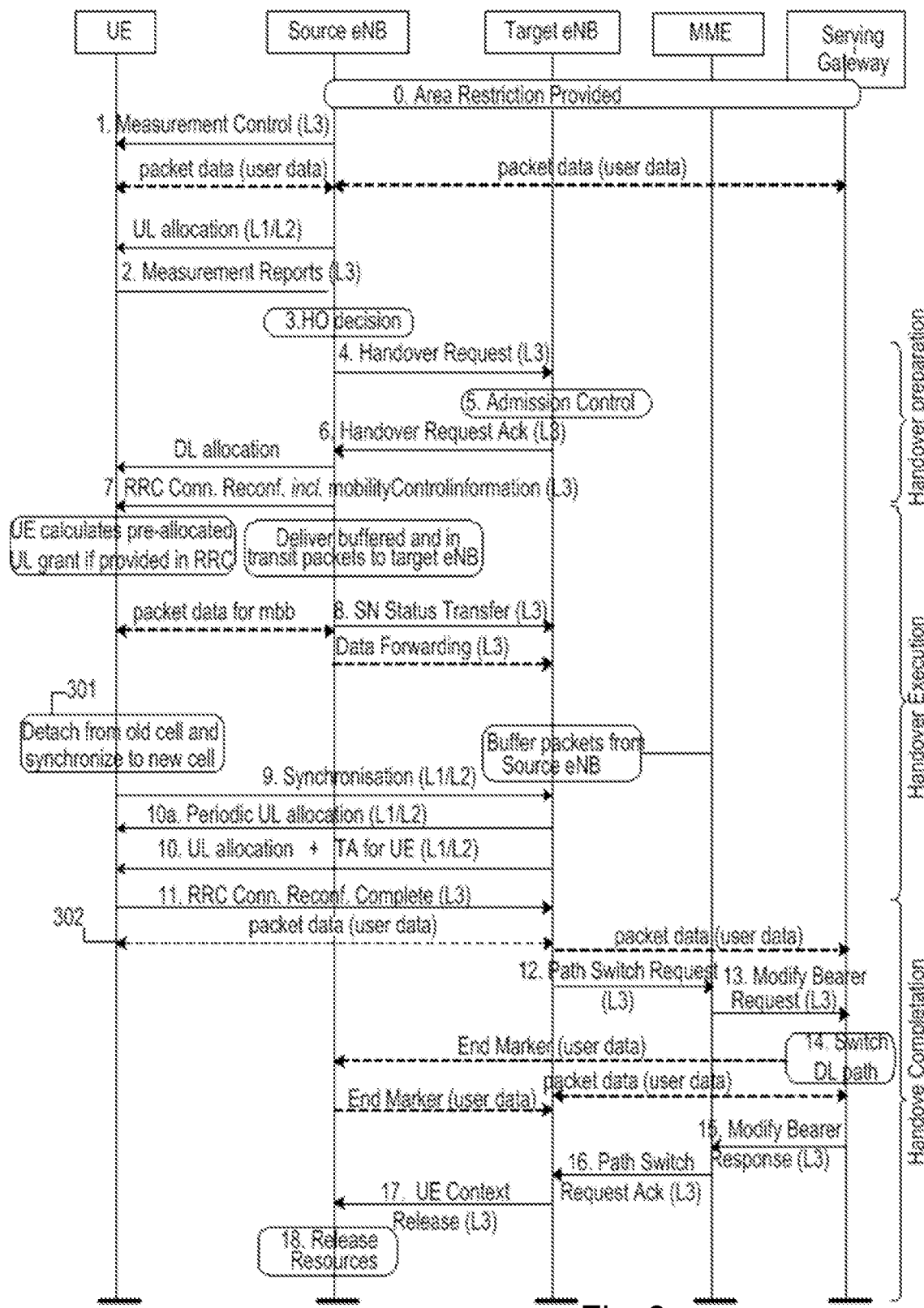
FIG. 3 is a schematic sequence diagram illustrating prior art.
Figure 4A:
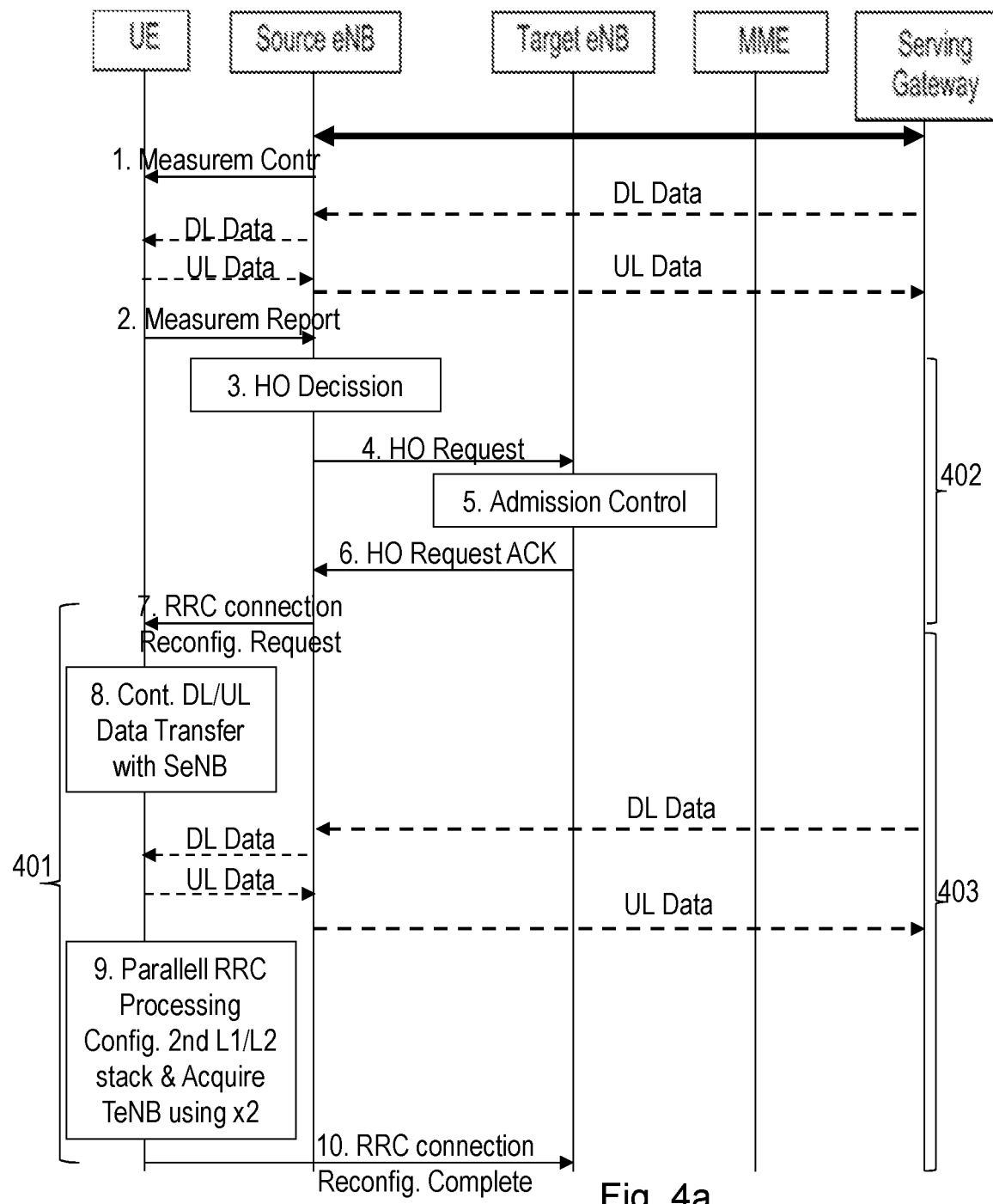
FIGS. 4 *a* and *b* are schematic sequence diagrams illustrating prior art.
Figure 4B:
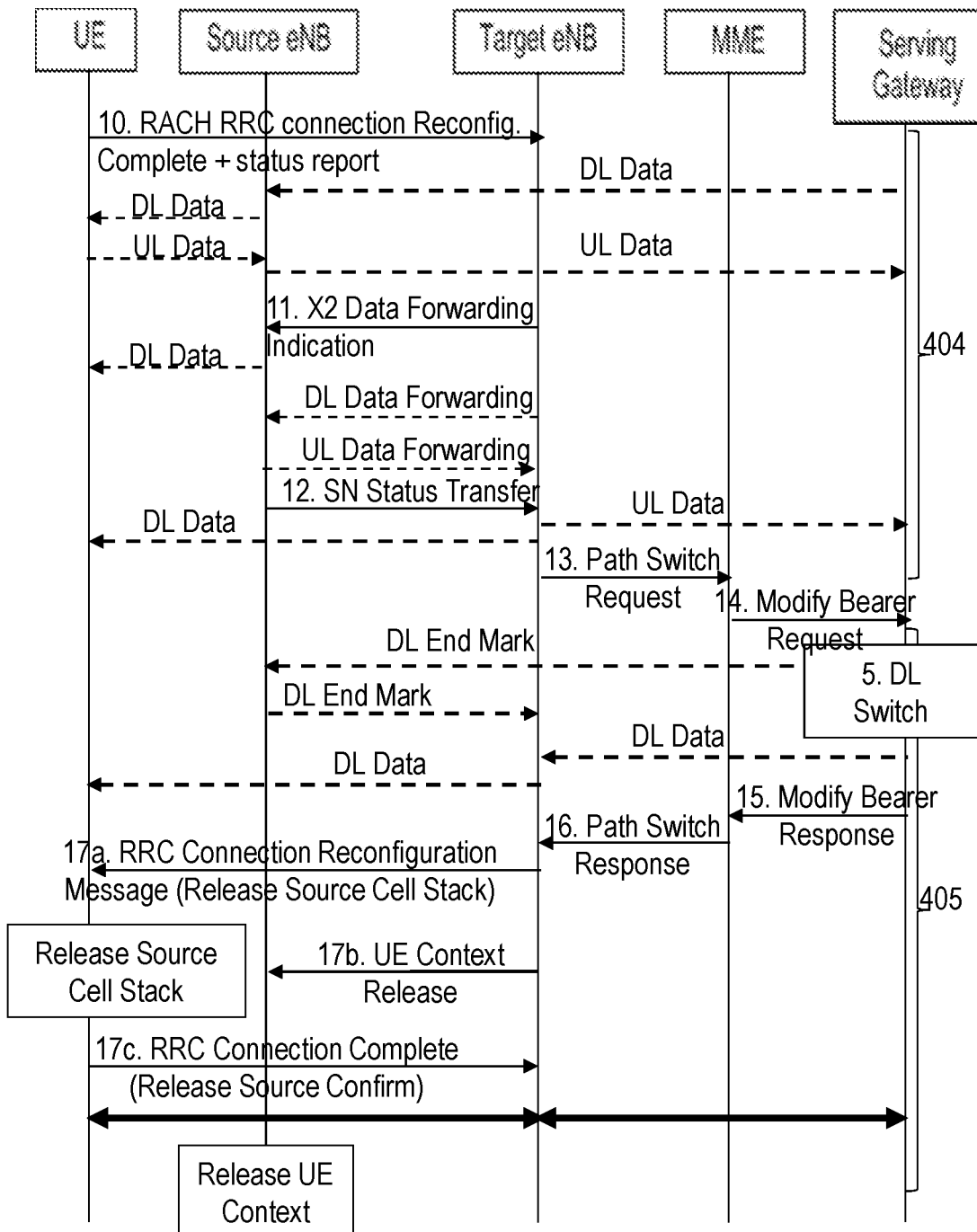
Figure 5:
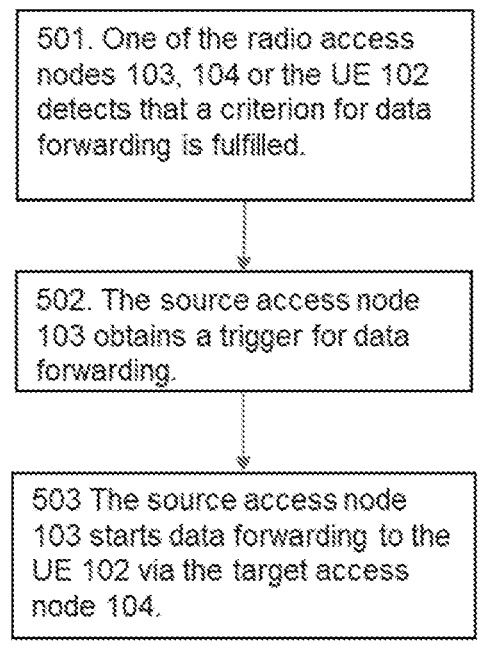
FIG. 5 is a flowchart depicting embodiments of a method in an access node.

According to an example of embodiments herein, an access node such as a source access node obtains a trigger which it uses to initiate DL forwarding earlier than in the solution in FIG. 4, e.g. earlier than receiving first RRC message or data packet from the UE by the target access node. The wording "a trigger" when used herein may mean a "cause to initiate". This trigger may be obtained by alternative ways, from either the UE, the target access node or the source access node e.g. according to the example depicted in FIG. 5 and according to any one or more of the below example actions:

501. The UE detects that a criteria to start data forwarding is fulfilled. For example, when the UE receives Random Access Response (RAR) from the target access node, the UE sends an indication to the source access node, which will trigger the source access node to start DL data forwarding to the target access node.

502. The target access node detects that the criteria to start data forwarding is fulfilled. For example, when the target access node sends Random Access Response (RAR) to the UE, the target access node sends a Data Forwarding indication to the source access node (which will then trigger DL data forwarding to the target access node).

503. The source access node detects that the criteria to start data forwarding is fulfilled For example, lack of ACK of DL data packets in the source access node triggers the source access node to start DL data forwarding to the target access node.

Some advantages of embodiments provided herein may comprise that they reduces the user plane latency by ensuring that the target cell has valid data to be sent to the UE upon receiving the messages e.g. an RRCConnectionReconfiguraitonComplete message from the UE, i.e., when it is possible for the target cell to schedule DL data transmission to the UE.

Figure 6:
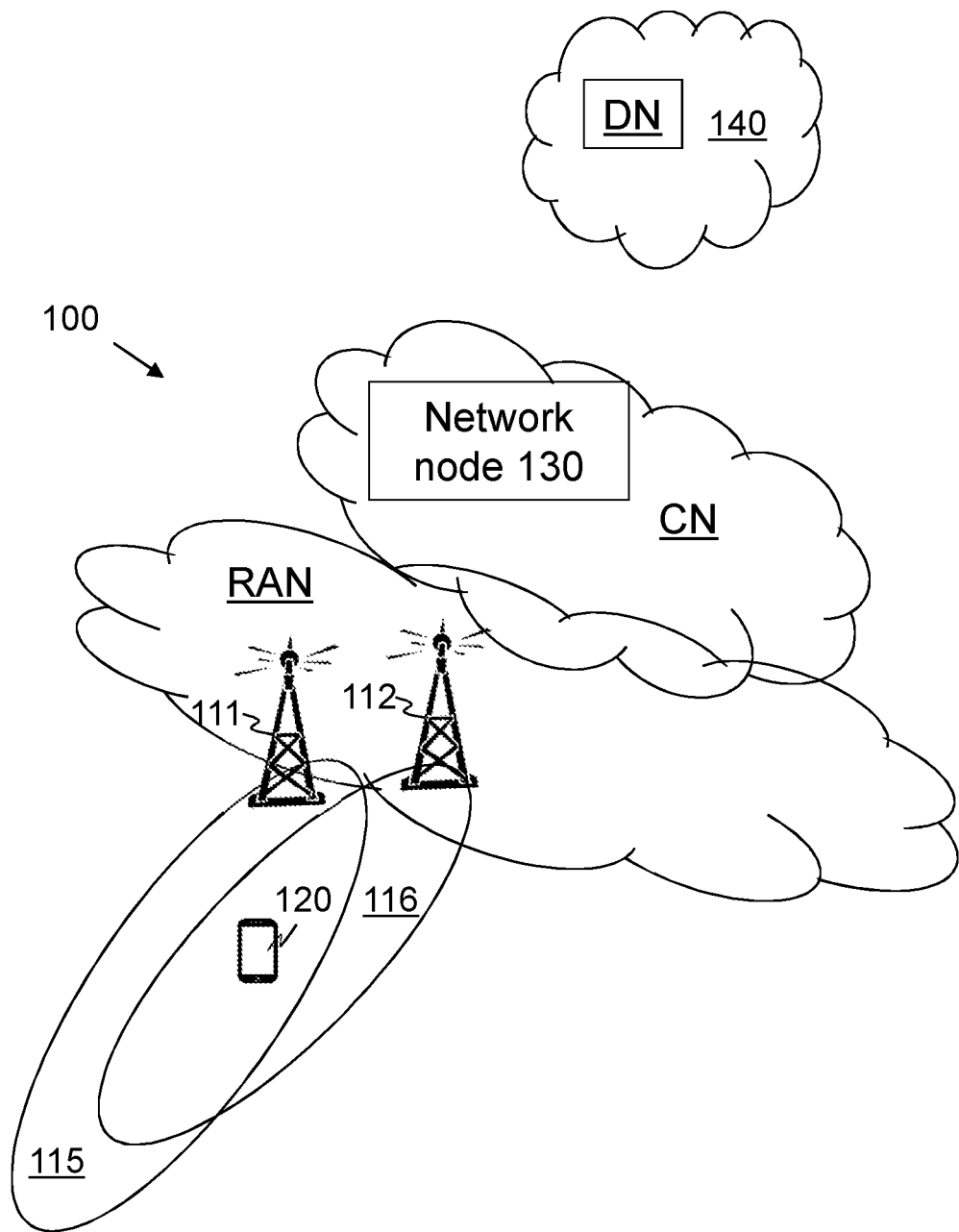
FIG. 6 is a schematic block diagram illustrating embodiments of a wireless communications network.

Embodiments herein relate to wireless communication networks in general. FIG. 6 is a schematic overview depicting a wireless communications network 100 wherein embodiments herein may be implemented. The wireless communications network 100 comprises one or more RANs and one or more CNs. The wireless communications network 100 may use a number of different technologies, such as W-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a context, however, embodiments are also applicable in further development of the existing wireless communication systems such as e.g. WCDMA and LTE.

Access nodes operate in the wireless communications network 100 such as a source access node 111 and a target access node 112. The source access node 111 provides radio coverage over a geographical area, a service area referred to as a source cell 115, which may also be referred to as a beam or a beam group of a first radio access technology (RAT), such as 5G, LTE, Wi-Fi or similar. The target access node 112 also provides radio coverage over a geographical area, a service area referred to as a target cell 116, which may also be referred to as a beam or a beam group of a first radio access technology (RAT), such as 5G, LTE, Wi-Fi or similar. The first and second access nodes 111, 112 may each be a NR-RAN node, transmission and reception point e.g. a base station, a radio access node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the respective source and target access node 111, 112 depending e.g. on the first radio access technology and terminology used. The respective source and target access node 111, 112 may be referred to as serving radio access nodes and communicates with a UE with Downlink (DL) transmissions to the UE and Uplink (UL) transmissions from the UE. It should be noted that in embodiments herein, the source access node 111 may be the same node as the target access node 112, if one node serves both the source cell 115 and the target cell 116. to a target cell 116.

A number of UEs operate in the wireless communication network 100, such as a UE 120. The UE 120 may be a mobile station, a non-access point (non-AP) STA, a STA, a user equipment and/or a wireless terminals, that communicate via one or more Access Networks (AN), e.g. RAN, e.g. via the source and/or target access nodes 111, 112 to one or more core networks (CN) comprising at least one NGC node 130. It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Methods herein may in a first aspect be performed by the access node such as the source access node 111, and in a second aspect by the UE 120. As an alternative, a Distributed Node (DN) and functionality, e.g. comprised in a cloud 140 as shown in FIG. 6, may be used for performing or partly performing the methods.

Figure 7:
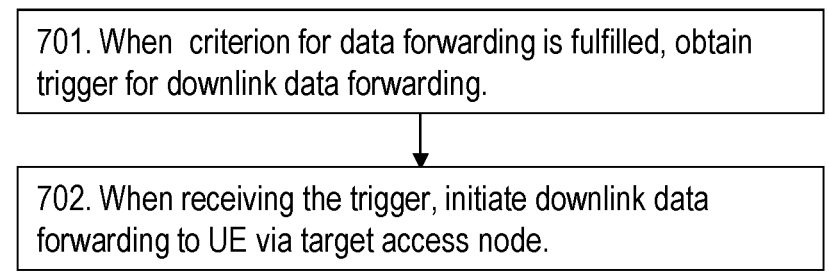
FIG. 7 is a flowchart depicting embodiments of a method in a source access node.

FIG. 7 shows an example method in the access node, such as e.g. a source access node 111, e.g. for performing data forwarding at handover of the UE 120 from the source cell 115 e.g. served by the source access node 111, to a target cell 116 e.g. served by a target access node 112 in the wireless communication network 100.

The source access node 111 and the target access node 112 may be the same network node.

According to an example scenario, the UE 120 is served in the source cell 115 and moves towards the target cell 116. The UE 120 is engaged in an ongoing communication with the wireless communication network 100 in the source cell 115 and a handover to the target cell is needed.

In short, the method comprises one or more of the following actions:

In Action 701, when a criterion for data forwarding is fulfilled, the access node such as e.g. the source access node 111 obtains a trigger for downlink data forwarding. The wording "a trigger for downlink data forwarding", when used herein may mean "a cause to initiate the downlink data forwarding".

In Action 702, when receiving the trigger, the access node such as e.g. the source access node 111 initiates downlink data forwarding to the UE 120 via the target access node 112. This is preferably performed immediately after obtaining the trigger.

In this way, the DL forwarding is initiated earlier than in the solution in FIG. 4 above, e.g. earlier than receiving first RRC message or data packet from the UE by the target access node which results in a reduced delay in the DL data transfer.

The access node may e.g. be the source access node 111, and is sometimes referred to as the access node 111.

The method actions depicted in FIG. 7 will now be described more in detail.

Action 701

When a criterion for data forwarding is fulfilled, the access node 111 obtains a trigger for downlink data forwarding.

The criterion for data forwarding may e.g. be fulfilled when the UE 120 successfully receives a response message such as e.g. a RAR, from the target access node 112, see e.g. Example 1 described below.

The criterion for data forwarding may e.g. be fulfilled when the UE 120 sends a message such as e.g. a RRC reconfiguration complete message to the target access node 112, see e.g. Example 2 described below.

The criterion for data forwarding may e.g. be fulfilled when the target access node 112 sends a response message such as the RAR to the UE 120 in the target cell 116, see e.g. Example 3 described below, The criterion for data forwarding may e.g. be fulfilled when the target access node 112 receives the RRC reconfiguration complete message from the UE 120 in the target cell 116, see e.g. Example 4 described below.

The criterion for data forwarding may further be fulfilled when any one out of: The source access node 111 fails to receive ACKs from the UE 120 in the source cell 115 for a first certain specified time or, the source access node 111 receives NACK for a second certain specified time, see e.g. Example 5 described below.

The criterion for data forwarding may further be fulfilled when any one out of: When the source access node 111 receives a message such as a HO Request Ack providing target access node 112 with user plane tunnel endpoints, or, when the source access node 111 sends a message such as a Handover Command to the UE 120, or, when the source access node 111 sends a message such as an SN Status Transfer to the target access node 112 after sending a message such as a HO Command, see e.g. Example 6 described below.

Action 702

When receiving the trigger, the access node 111 initiating 702 downlink data forwarding to the UE 120 via the target access node 112.

The trigger for downlink data forwarding may e.g. be obtained according to any one out of: from the UE 120, from the target access node 112 or in the source access node 111.

As mentioned above, the criterion for data forwarding may be fulfilled when the UE 120 successfully receives a response message such as e.g. a RAR, from the target access node 112, see e.g. Example 1 described below. In this case the trigger for downlink data forwarding may be obtained from the UE 120 when the criterion is fulfilled. The trigger may e.g. comprise an indication to the source access node 111 that the UE 120 has received the RAR from the target access node 112.

As mentioned above, the criterion for data forwarding may e.g. be fulfilled when the UE 120 sends a message such as e.g. a RRC reconfiguration complete message to the target access node 112, see e.g. Example 2 described below. In this case the trigger for downlink data forwarding may e.g. be obtained from the UE 120 when the criterion is fulfilled. The trigger may e.g. comprise an indication to the source access node 111 that the UE 120 has transmitted the message such as e.g. the RRC reconfiguration complete message.

As mentioned above, the criterion for data forwarding may e.g. be fulfilled when the target access node 112 sends a response message such as the RAR to the UE 120 in the target cell 116, see e.g. Example 3 described below. In this case the trigger for downlink data forwarding may be obtained from the target access node 112 when the criterion is fulfilled. The trigger may e.g. comprise an indication to the source access node 111 to forward the data packets, e.g. to start forward the data packets.

As further mentioned above, the criterion for data forwarding may be fulfilled when the target access node 112 receives the RRC reconfiguration complete message from the UE 120 in the target cell 116, see e.g. Example 4 described below. In this case the trigger for downlink data forwarding may be obtained from the target access node 112 when the criterion is fulfilled. The trigger may e.g. comprise an indication to the source access node 111 to forward the data packets.

As further mentioned above, the criterion for data forwarding may be fulfilled when any one out of: The source access node 111 fails to receive ACKs from the UE 120 in the source cell 115 for a first certain specified time or, the source access node 111 receives NACK for a second certain specified time, see e.g. Example 5 described below. In this case the trigger for downlink data forwarding may be obtained in the source access node 111 when the criterion for data forwarding is fulfilled.

As yet further mentioned above, the criterion for data forwarding may be fulfilled when any one out of: When the source access node 111 receives a message such as a HO Request Ack providing target access node 112 with user plane tunnel endpoints, or, when the source access node 111 sends a message such as a Handover Command to the UE 120, or, when the source access node 111 sends a message such as an SN Status Transfer to the target access node 112 after sending a message such as a HO Command, see e.g. Example 6 described below. In this case the trigger for downlink data forwarding may be obtained in the source access node 111 when the criterion for data forwarding is fulfilled.

Figure 8:
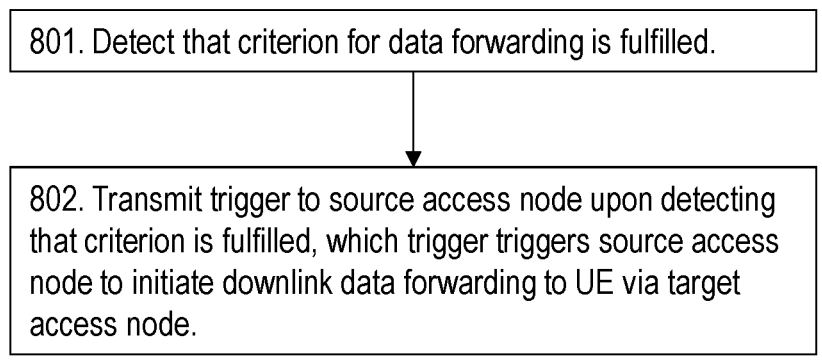
FIG. 8 is a flowchart depicting embodiments of a method in a user equipment.

FIG. 8 shows an example method performed by the UE 120 e.g. for handling, e.g. performing handover of from the source cell 115 e.g. served by the source access node 111, to the target cell 116 e.g. served by a target access node 112 in the wireless communication network 100. The method comprises one or more of the following actions:

According to the example scenario, the UE 120 is served in the source cell 115 and moves towards the target cell 116. The UE 120 is engaged in an ongoing communication with the wireless communication network 100 in the source cell 115 and a handover to the target cell is needed.

Action 801

The UE 120 detects that a criterion for data forwarding is fulfilled.

Action 802, the UE 120 then transmits a trigger to the access node, e.g. the source access node 111 upon detecting that the criterion is fulfilled. The trigger triggers the source access node 111 to initiate downlink data forwarding to the UE 120 via the target access node 112.

In this way, the DL forwarding is initiated earlier than in the solution in FIG. 4 above, e.g. earlier than receiving first RRC message or data packet from the UE by the target access node which results in a reduced delay in the DL data transfer.

The criterion for data forwarding may e.g. be fulfilled when the UE 120 sends a message to the target access node 112, see e.g. Example 2 described below.

The criterion for data forwarding may e.g. be fulfilled when the UE 120 receives a message such as e.g. a RAR message from the target access node 112, see e.g. Example 3 described below.

The methods will now be described and exemplified in more detail in the below Examples 1-6.

Figure 9:
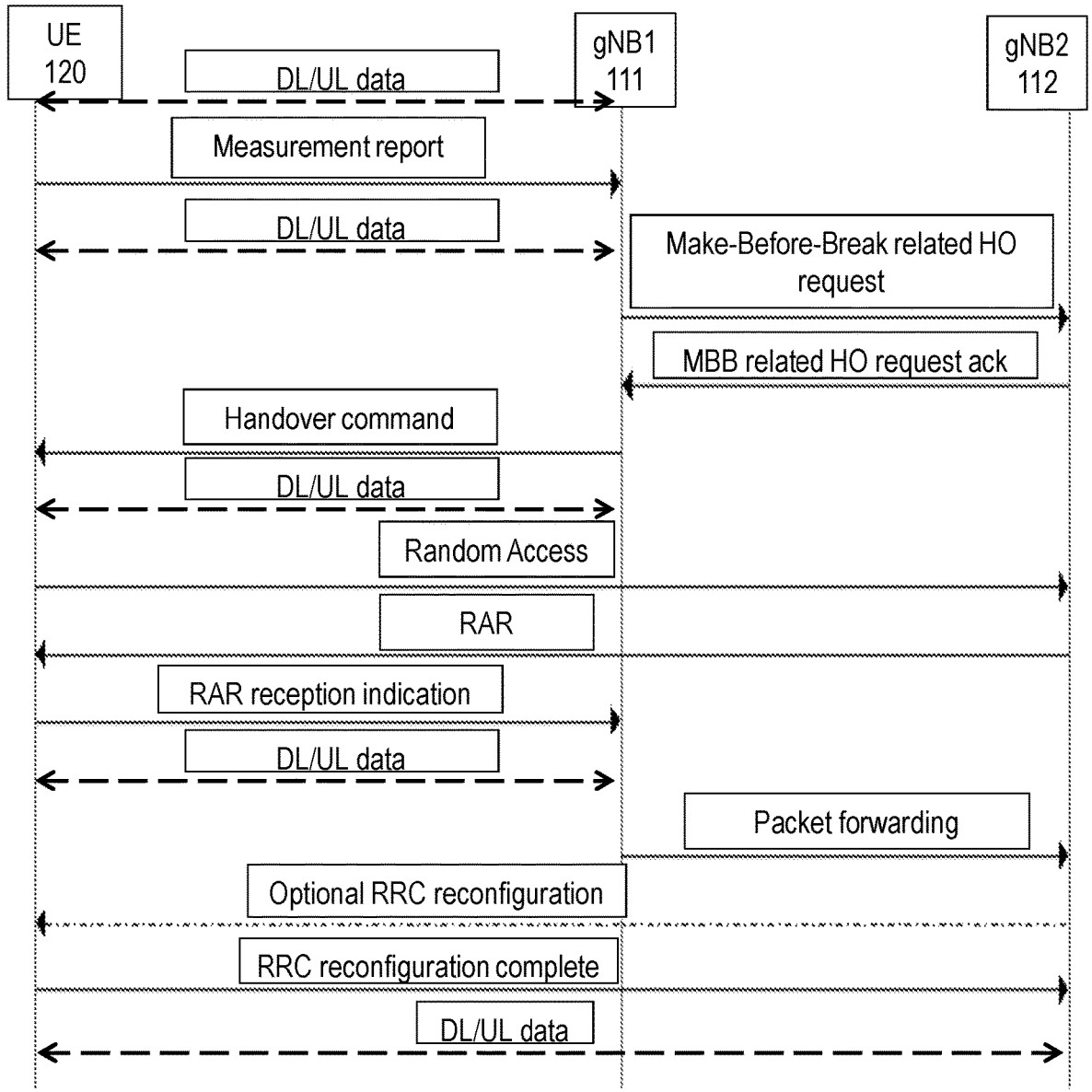
FIG. 9 is a schematic sequence diagram illustrating embodiments of a method.

Example 1 is depicted in FIG. 9.

In this Example, the criterion for data forwarding is fulfilled when the UE 120 successfully receives a response message such as e.g. a RAR, from the target access node 112 and the trigger for downlink data forwarding is obtained from the UE 120 when the criterion is fulfilled. The trigger e.g. comprises an indication e.g. in the source cell 115 to the source access node 111 that the UE 120 has received the RAR from the target access node 112.

According to an example of this Example, when the UE 120 successfully receives the RAR from the target access node 112 in the target cell, the UE 120 sends an indication in the source cell to the source access node 111 that it has received RAR from the target access node 112 in the target cell. Upon such an indication from the UE 120, the source access node 111 forwards the data packets to the target access node 112.

Figure 10:
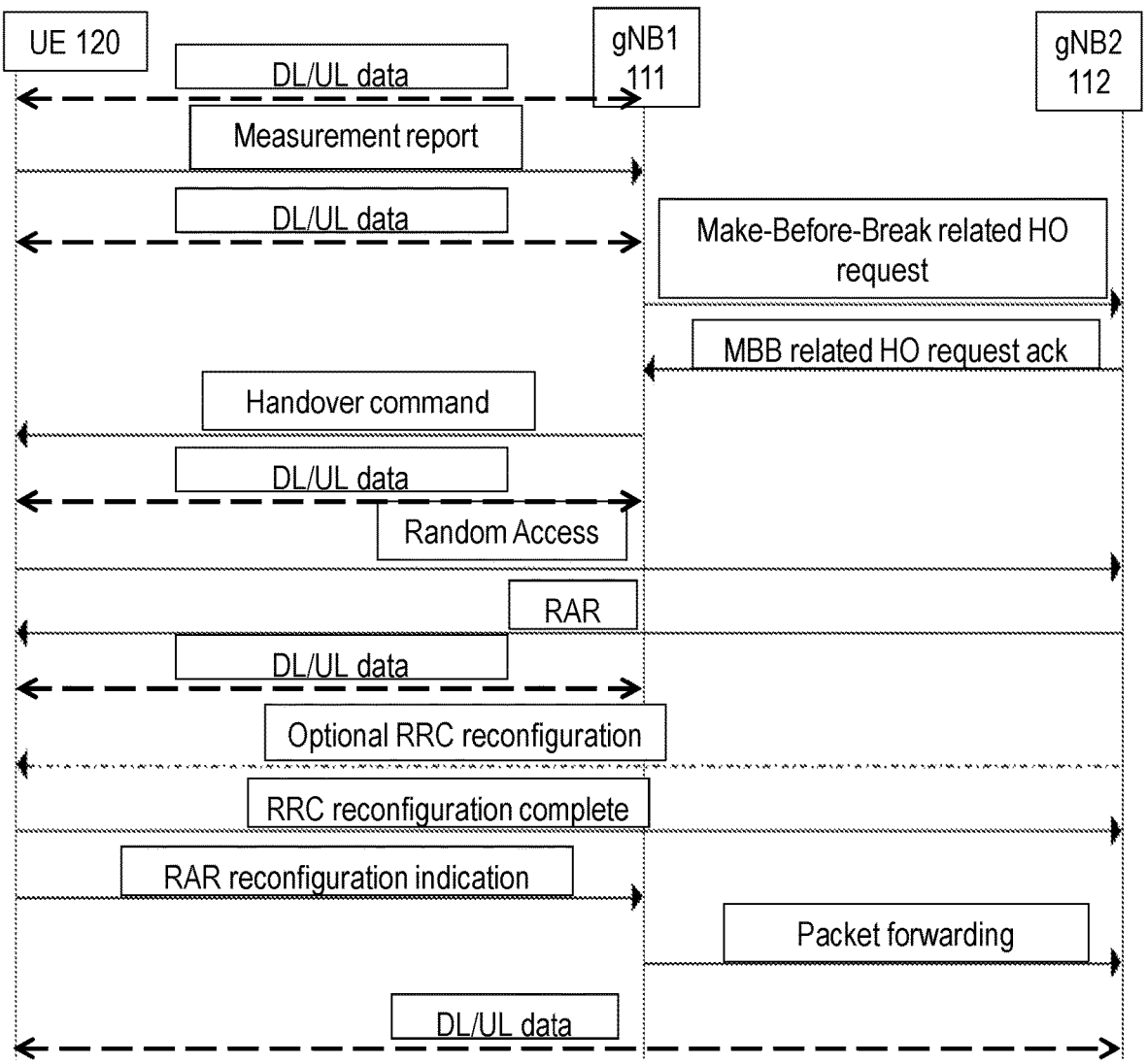
FIG. 10 is a schematic sequence diagram illustrating embodiments of a method.

Example 2 is depicted in FIG. 10. In this Example, the criterion for data forwarding is fulfilled when the UE 120 sends a message such as e.g. a RRC reconfiguration complete message to the target access node 112 and the trigger for downlink data forwarding is obtained from the UE 120 when the criterion is fulfilled. The trigger e.g. comprises an indication to the source access node 111 that the UE 120 has transmitted the message such as the RRC reconfiguration complete message.

According to an example of this embodiment, when the UE 120 sends the RRC reconfiguration complete message in the target cell to the target access node 112, the UE 120 sends an indication in the source cell to the source access node 111 that it has transmitted the RRC reconfiguration complete message. Upon such an indication from the UE 120, the source access node 111 forwards the data packets to the target access node 112.

Figure 11:
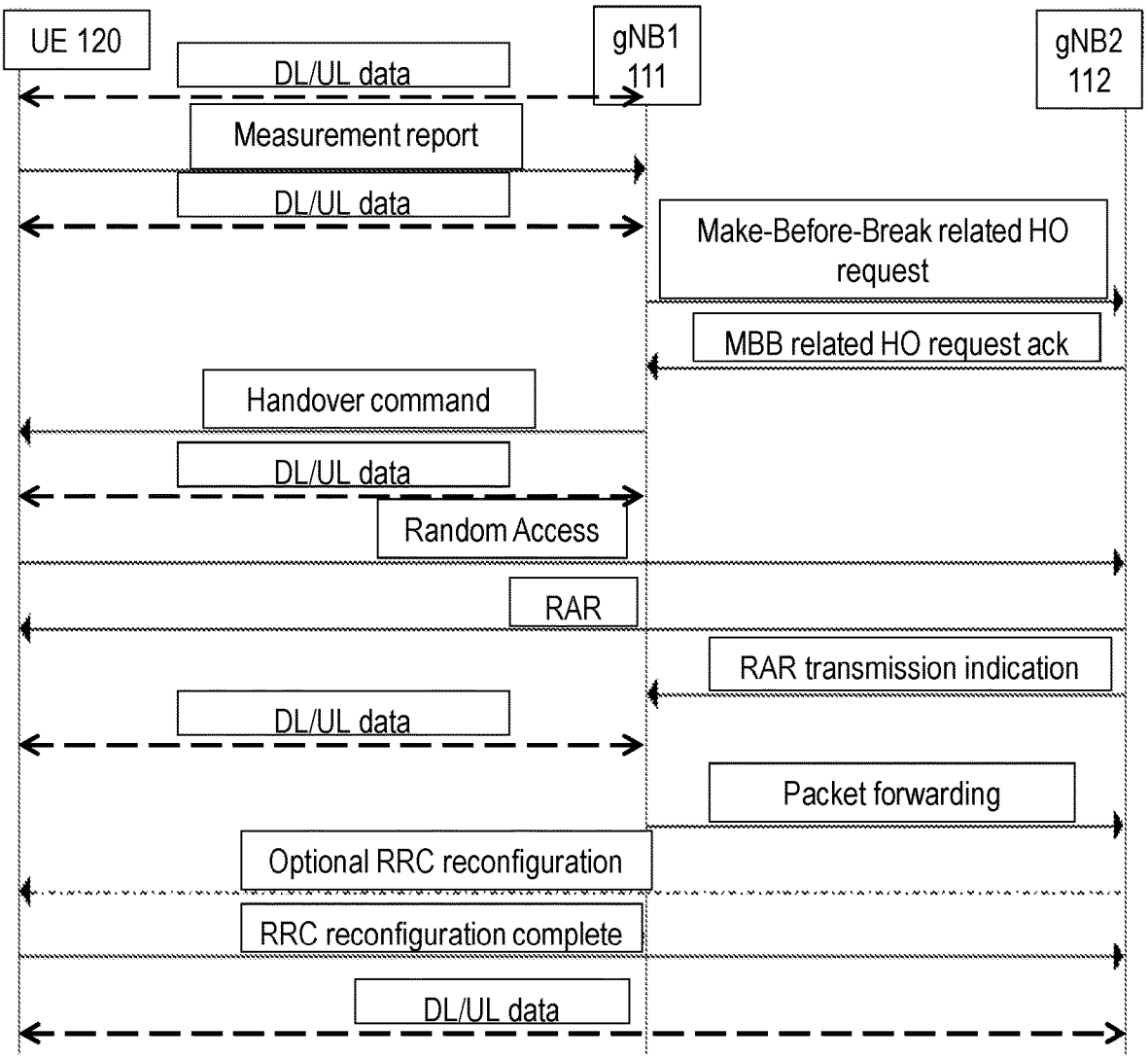
FIG. 11 is a schematic sequence diagram illustrating embodiments of a method.

Example 3 is depicted in FIG. 11. In this Example, the criterion for data forwarding is fulfilled when the target access node 112 sends a response message such as the RAR to the UE 120 in the target cell 116, and the trigger for downlink data forwarding is obtained from the target access node 112 when the criterion is fulfilled. The trigger e.g. comprises an indication to the source access node 111 to forward the data packets.

According to an example, when the target access node 112 sends the RAR to the UE 120 in the target cell, the target access node 112 sends an indication to the source access node 111 that it can such as is capable of forward the data packets. Upon such an indication from the target access node 112, the source access node 111 forwards the data packets to the target access node 112.

Figure 12:
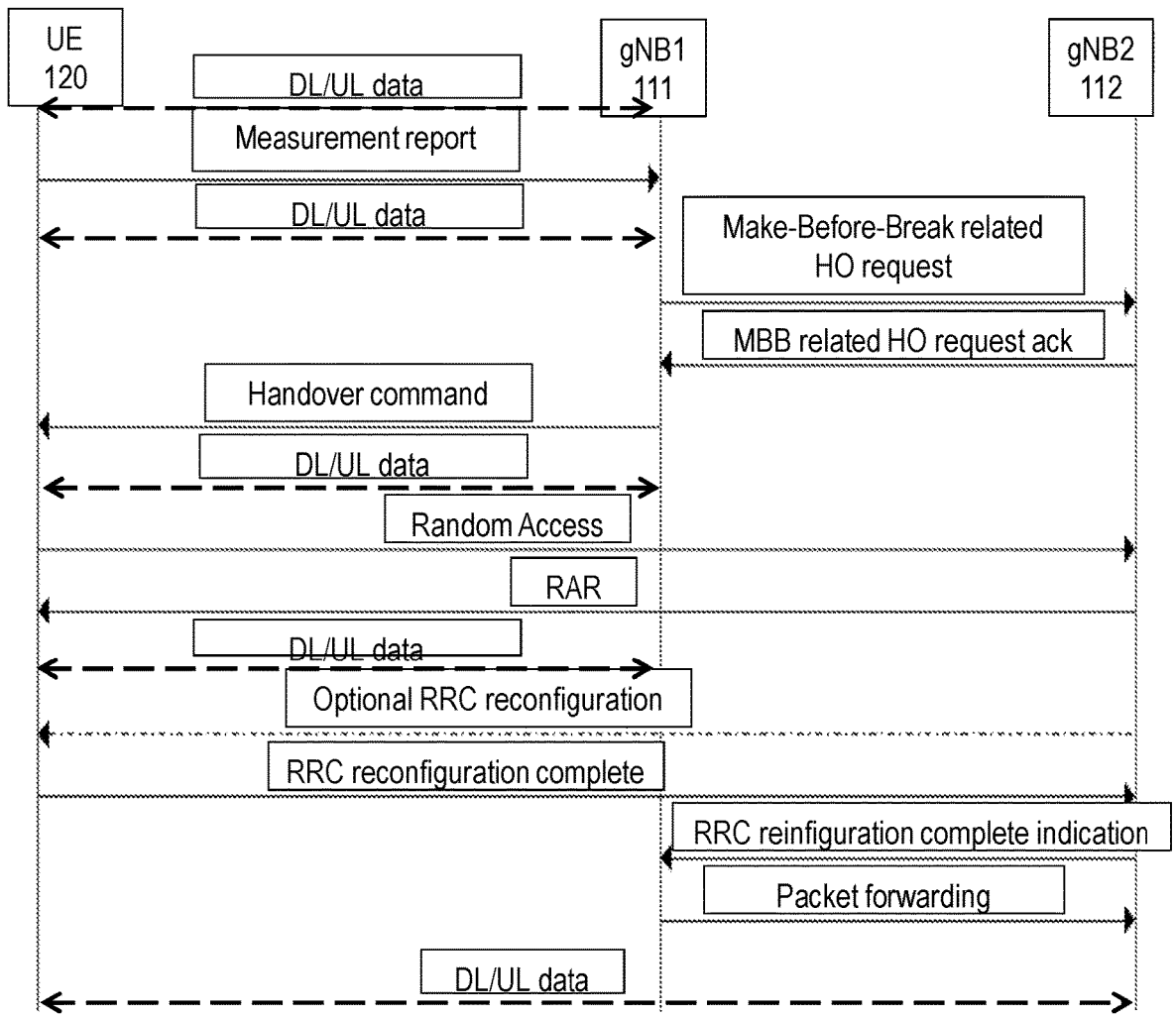
FIG. 12 is a schematic sequence diagram illustrating embodiments of a method.

Example 4 is depicted in FIG. 12. In this Example, the criterion for data forwarding is fulfilled when the target access node 112 receives the RRC reconfiguration complete message from the UE 120 in the target cell 116, and the trigger for downlink data forwarding is obtained from the target access node 112 when the criterion is fulfilled. The trigger e.g. comprises an indication to the source access node (111) to forward the data packets.

According to an example, when the target access node 112 receives the RRC reconfiguration complete message from the UE 120 in the target cell, the target access node 112 sends an indication to the source access node 111 that it can forward the data packets. Upon such an indication, the source access node 111 forwards the data packets to the target access node 112.

Figure 13:
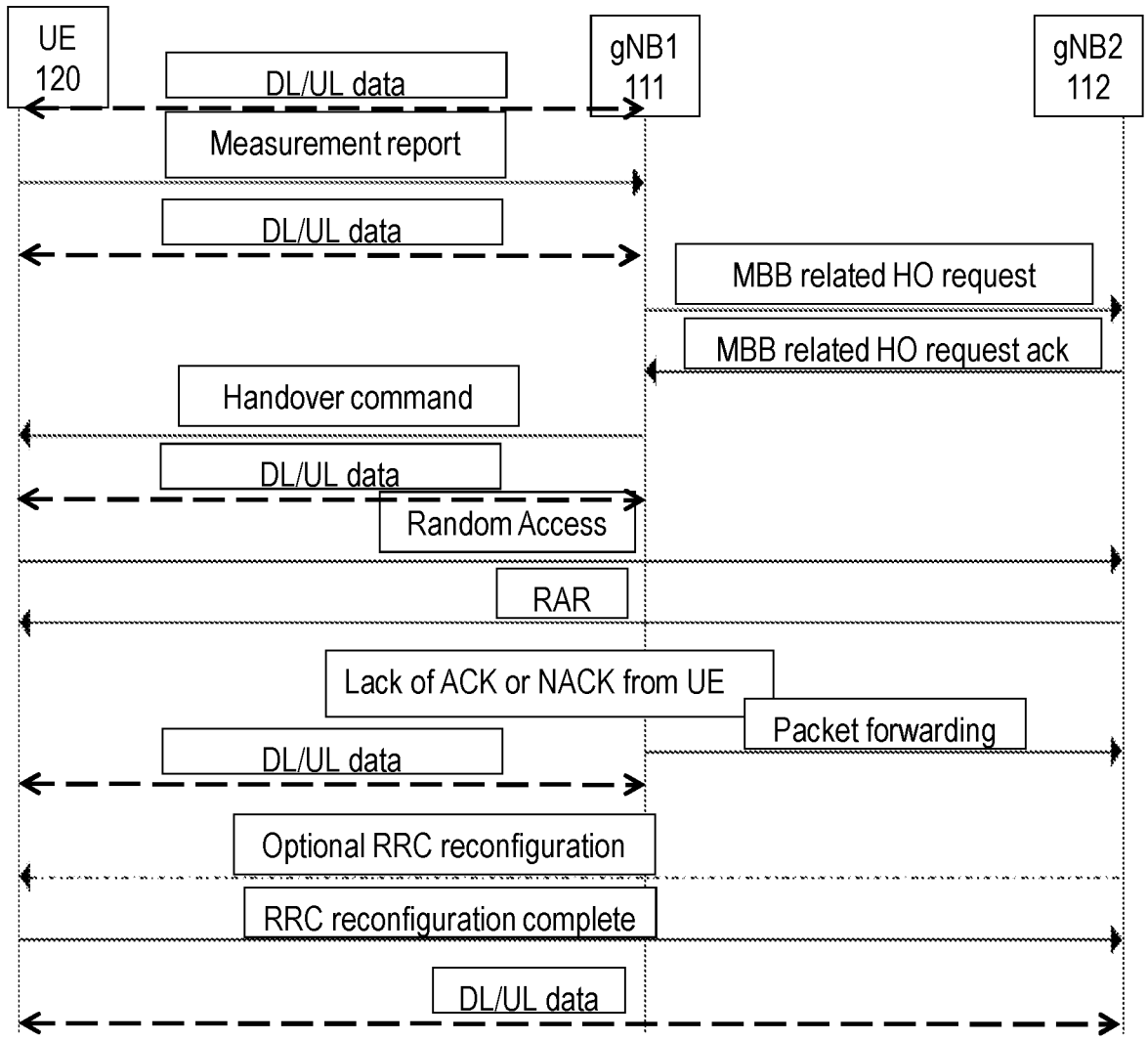
FIG. 13 is a schematic sequence diagram illustrating embodiments of a method.

Example 5 is depicted in FIG. 13. In this Example, the criterion for data forwarding is fulfilled when any one out of. The source access node 111 fails to receive ACKs from the UE 120 in the source cell 115 for a first certain specified time or, the source access node 111 receives NACK for a second certain specified time. In this Example, the trigger for downlink data forwarding is obtained in the source access node 111 when the criterion for data forwarding is fulfilled.

According to an example, when the source access node 111 fails to receive ACKs from the UE 120 in the source cell 115 for a certain specified time or if the source access node 111 receives NACK for a certain specified time (such as a certain time period or for a certain specified time after transmission of the Handover command), the source access node 111 forwards the data packets to the target cell 116. Here, the ACK and/or NACKs may be on either RLC or HARQ protocol level.

Figure 14:
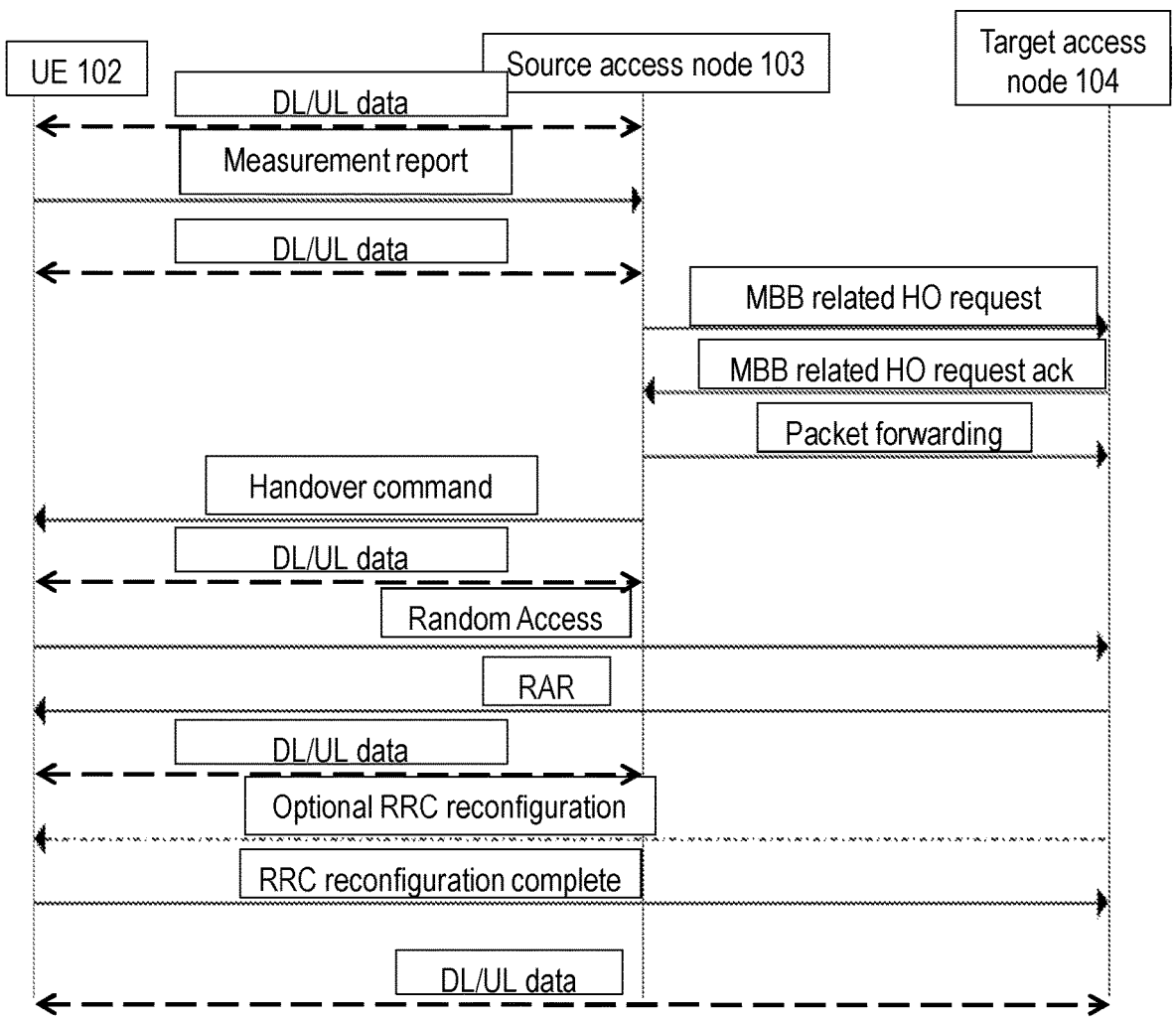
FIG. 14 is a schematic sequence diagram illustrating embodiments of a method.

Example 6 is depicted in FIG. 14. In this Example, the criterion for data forwarding is fulfilled when any one out of: When the source access node 111 receives a message such as a HO Request Ack providing target access node 112 with user plane tunnel endpoints, or, when the source access node 111 sends a message such as a Handover Command to the UE 120, or, when the source access node 111 sends a message such as an SN Status Transfer to the target access node 112 after sending a message such as a HO Command. In this Example, the trigger for downlink data forwarding is obtained in the source access node 111 when the criterion for data forwarding is fulfilled.

According to an example, this embodiment addresses further a potential loss of packets and to premature the loss of the UE 120's connection to the source access node 111 in the source cell. In this Example, the source access node 111 may begin to forward data to the target access node 112 when it has received HO Request Ack providing target access node 112 with user plane tunnel endpoints or alternatively, when it has sent the Handover Command to the UE 120. Alternatively, if the source access node 111 sends an SN Status Transfer (e.g. an indication of the PDCP sequence number) to the target access node 112 after sending the HO Command, the data forwarding can start after the SN Status Transfer has been sent, or in parallel with it. To avoid interruption in the user plane data flow, the source access node 111 may duplicate DL user plane data to the UE 120 in the source cell (and forwarding to the target access node 112). Similarly, the source access node 111 may duplicate UL user plane data to the core network (UPF(s)) (and forwarding to the target access node 112).

In the described text and Examples herein 1-6, the source access node 111 and the target access node 112 may be the same access node, i.e. the source cell 115 and the target cell 116 are controlled by the same access node, i.e. an intra-access node handover), in which case the described inter-access node signaling becomes an intra-access node matter.

It should be understood that the message sequences illustrating the Examples 1-6 are examples of specific messages used in the method. For example, the "Handover command" message may alternatively be an RRCConnectionReconfiguration message or another type of message. And for example, the RRCConnectionReconfigurationComplete message may alternatively be an Handover Complete message or another type of message.

Figure 15A:
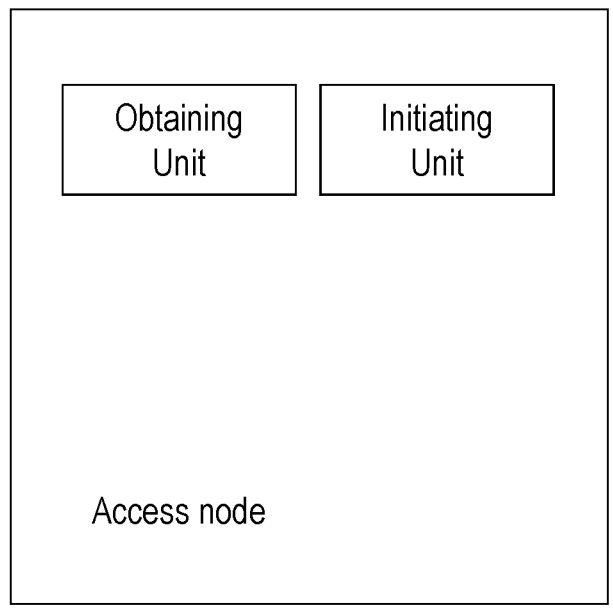
FIGS. 15 *a-b* are schematic block diagrams illustrating an embodiment of a source access node.
Figure 15B:
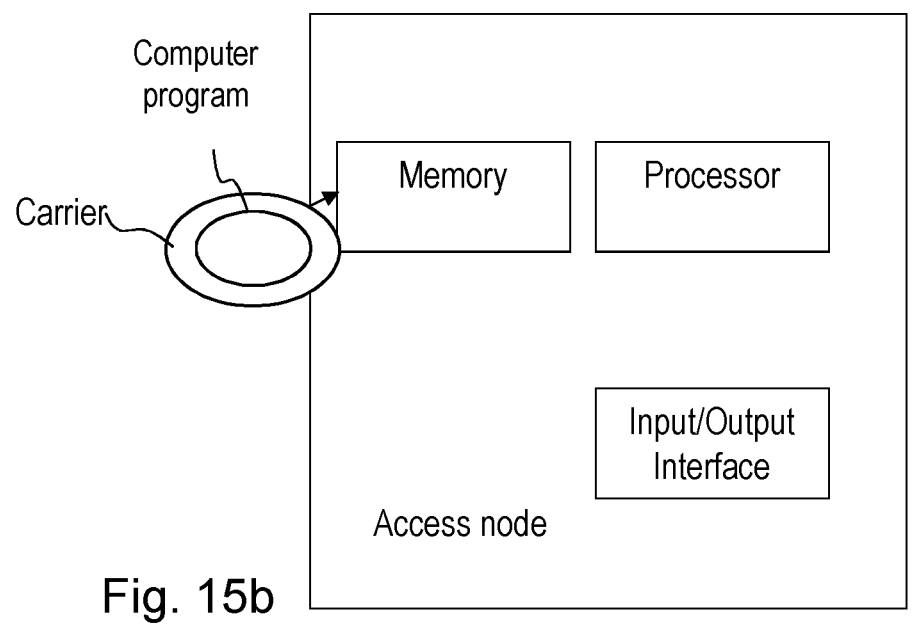
Figure 16A:
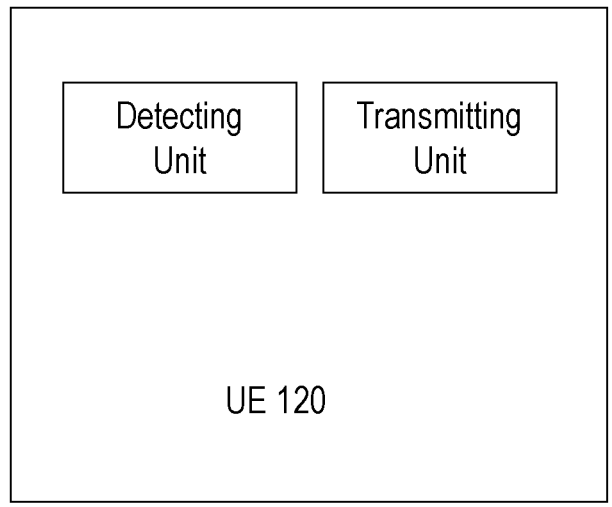
FIGS. 16 *a-b* are schematic block diagrams illustrating an embodiment of a user equipment.

FIGS. 15 *a* and *b* shows an example of the access node such as the source access node 111 and FIG. 16 *a* and *b* shows an example of the UE 120. The access node is referred to as the access node 111 in below text.

Figure 16B:
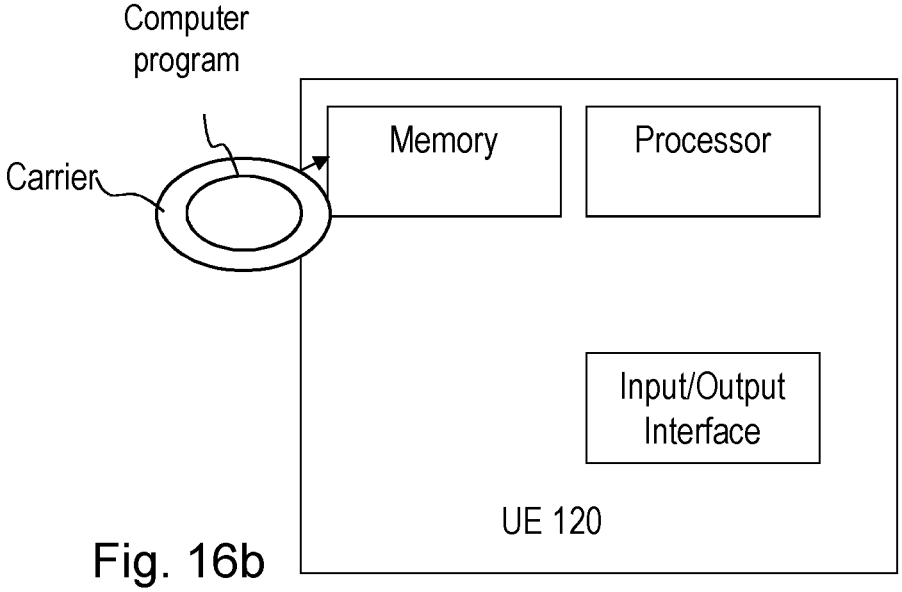

The access node 111 and the UE 120 may comprise a respective input and output interface configured to communicate with each other, see FIGS. 15*b* and 16*b*. The input and output interface may comprise a wireless receiver (not shown) and a wireless transmitter (not shown).

The embodiments herein may be implemented through a respective processor or one or more processors, such as the processor of a processing circuitry in the access node 111 and the UE 120 depicted in FIGS. 15 and 16 together with computer program code for performing the functions and actions of the embodiments herein. The program code mentioned above may also be provided as a computer program product, for instance in the form of a data carrier carrying computer program code for performing the embodiments herein when being loaded into the access node 111 and the UE 120. One such carrier may be in the form of a CD ROM disc. It is however feasible with other data carriers such as a memory stick. The computer program code may furthermore be provided as pure program code on a server and downloaded to the access node 111 and the UE 120.

The access node 111 and the UE 120 may further comprise respective a memory comprising one or more memory units. The memory comprises instructions executable by the processor in the access node 111 and the UE 120.

The memory is arranged to be used to store e.g. information, data, configurations, and applications to perform the methods herein when being executed in the access node 111 and the UE 120.

In some embodiments, a respective computer program comprises instructions, which when executed by the at least one processor, cause the at least one processor of the access node 111 and the UE 120 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the units in the access node 111 and the UE 120, described above may refer to a combination of analog and digital circuits, and/or one or more processors configured with software and/or firmware, e.g. stored in the access node 111 and the UE 120, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Some example Embodiments numbered 1-28 are described below. The following embodiments refer among other things to FIG. 6, FIG. 7, FIG. 8, FIG. 15 *a, b* and FIG. 16 *a, b*.

Embodiment 1. A method performed by a an access node, such as e.g. a source access node 111, e.g. for performing data forwarding at handover of a UE 120 from a source cell 115 e.g. served by the source access node 111, to a target cell 116 e.g. served by a target access node 112 in a wireless communications network 100, the method comprising:

when a criterion for data forwarding is fulfilled, obtaining 701 a trigger for downlink data forwarding, and when receiving the trigger, initiating 702 downlink data forwarding to the UE 120 via the target access node 112.

Embodiment 2. The method according to embodiment 1, where the trigger for downlink data forwarding is obtained according to any one out of: from the UE 120, from the target access node 112 or in the source access node 111.

Embodiment 3. The method according to any of the embodiments 1-2, wherein the criterion for data forwarding is fulfilled when the UE 120 successfully receives a response message such as e.g. a RAR, from the target access node 112, such as e.g. Example 1, and wherein the trigger for downlink data forwarding is obtained from the UE 120 when the criterion is fulfilled, which trigger e.g. comprises an indication to the source access node 111 that the UE 120 has received the RAR from the target access node 112.

Embodiment 4. The method according to any of the embodiments 1-2, wherein the criterion for data forwarding is fulfilled when the UE 120 sends a message such as e.g. a RRC reconfiguration complete message to the target access node 112, such as e.g. Example 2, and wherein the trigger for downlink data forwarding is obtained from the UE 120 when the criterion is fulfilled, which trigger e.g. comprises an indication to the source access node 111 that the UE 120 has transmitted the message such as e.g. the RRC reconfiguration complete message.

Embodiment 5. The method according to any of the embodiments 1-2, wherein the criterion for data forwarding is fulfilled when the target access node 112 sends a response message such as the RAR to the UE 120 in the target cell 116, such as e.g. Example 3, and wherein the trigger for downlink data forwarding is obtained from the target access node 112 when the criterion is fulfilled, which trigger e.g. comprises, an indication to the source access node 111 to forward the data packets, e.g. to start forward the data packets.

Embodiment 6. The method according to any of the embodiments 1-2, wherein the criterion for data forwarding is fulfilled when the target access node 112 receives the RRC reconfiguration complete message from the UE 120 in the target cell 116, such as e.g. Example 4, and wherein the trigger for downlink data forwarding is obtained from the target access node 112 when the criterion is fulfilled, which trigger e.g. comprises an indication to the source access node 111 to forward the data packets.

Embodiment 7. The method according to any of the embodiments 1-2, wherein the criterion for data forwarding is fulfilled when any one out of:

the source access node 111 fails to receive ACKs from the UE 120 in the source cell 115 for a first certain specified time or, the source access node 111 receives NACK for a second certain specified time, such as e.g. Example 5, and wherein the trigger for downlink data forwarding is obtained in the source access node 111 when the criterion for data forwarding is fulfilled.

Embodiment 8. The method according to any of the embodiments 1-2, wherein the criterion for data forwarding is fulfilled when any one out of:

when the source access node 111 receives a message such as a HO Request Ack providing target access node 112 with user plane tunnel endpoints, or, when the source access node 111 sends a message such as a Handover Command to the UE 120, or, when the source access node 111 sends a message such as an SN Status Transfer to the target access node 112 after sending a message such as a HO Command, such as e.g. Example 6, and wherein the trigger for downlink data forwarding is obtained in the source access node 111 when the criterion for data forwarding is fulfilled.

Embodiment 9. The method according to any of the embodiments 1-8, wherein the source access node 111 and the target access node 112 are the same network node.

Embodiment 10. A computer program comprising instructions, which when executed by a processor, causes the processor to perform actions according to any of the embodiments 1-9.

Embodiment 11. A carrier comprising the computer program of embodiment 10, wherein the carrier is one of an electronic signal, an optical signal, an electromagnetic signal, a magnetic signal, an electric signal, a radio signal, a microwave signal, or a computer-readable storage medium.

Embodiment 12. A method performed by a User Equipment, UE, 120 e.g. for handling a handover of from a source cell 115 e.g. served by the source access node 111, to a target cell 116 e.g. served by a target access node 112 in a wireless communications network 100, the method comprising any one or more out of:

detecting 801 that a criterion for data forwarding is fulfilled, and transmitting 802 a trigger to the source access node 111 upon detecting that the criterion is fulfilled, which trigger triggers, e.g. immediately triggers, the source access node 111 to initiate downlink data forwarding to the UE 120 via the target access node 112.

Embodiment 13. The method according to embodiment 12, wherein the criterion for data forwarding is fulfilled when the UE 120 receives a message such as e.g. a RAR message from the target access node 112 such as e.g. Example 3.

Embodiment 14. The method according to embodiment 12, wherein the criterion for data forwarding is fulfilled when the UE 120 sends a message to the target access node 112, such as e.g. Example 2.

Embodiment 15. A computer program comprising instructions, which when executed by a processor, causes the processor to perform actions according to any of the embodiments 12-14.

Embodiment 16. A carrier comprising the computer program of embodiment 15, wherein the carrier is one of an electronic signal, an optical signal, an electromagnetic signal, a magnetic signal, an electric signal, a radio signal, a microwave signal, or a computer-readable storage medium.

Embodiment 17. An access node, such as e.g. a source access node 111, configured e.g. for performing data forwarding at handover of a UE 120 from a source cell 115 e.g. served by the source access node 111, to a target cell 116 e.g. served by a target access node 112 in a wireless communications network 100, the access node such as e.g. a source access node 111, being configured to:

when a criterion for data forwarding is fulfilled, obtain a trigger for downlink data forwarding, e.g. by means of an obtaining unit in the access node, and when receiving the trigger, initiate downlink data forwarding to the UE 120 via the target access node 112, e.g. by means of an initiating unit in the access node.

Embodiment 18. The access node according to embodiment 17, where the trigger for downlink data forwarding is adapted to be obtained according to any one out of: from the UE 120, from the target access node 112 or in the source access node 111.

Embodiment 19. The access node according to any of the embodiments 17-18, wherein the criterion for data forwarding is adapted to be fulfilled when the UE 120 successfully receives a response message such as e.g. a RAR, from the target access node 112, such as e.g. Example 1, and wherein the trigger for downlink data forwarding is adapted to be obtained from the UE 120 when the criterion is fulfilled, which trigger e.g. is adapted to comprise an indication to the source access node 111 that the UE 120 has received the RAR from the target access node 112.

Embodiment 20. The access node according to any of the embodiments 17-18, wherein the criterion for data forwarding is adapted to be fulfilled when the UE 120 sends a message such as e.g. a RRC reconfiguration complete message to the target access node 112, such as e.g. Example 2, and wherein the trigger for downlink data forwarding is adapted to be obtained from the UE 120 when the criterion is fulfilled, which trigger e.g. e.g. is adapted to comprise an indication to the source access node 111 that the UE 120 has transmitted the message such as the RRC reconfiguration complete message.

Embodiment 21. The access node according to any of the embodiments 17-18, wherein the criterion for data forwarding is adapted to be fulfilled when the target access node 112 sends a response message such as the RAR to the UE 120 in the target cell 116, such as e.g. Example 3, and wherein the trigger for downlink data forwarding is adapted to be obtained from the target access node 112 when the criterion is fulfilled, which trigger e.g. e.g. is adapted to comprise, an indication to the source access node 111 to forward the data packets.

Embodiment 22. The access node according to any of the embodiments 17-18, wherein the criterion for data forwarding is adapted to be fulfilled when the target access node 112 receives the RRC reconfiguration complete message from the UE 120 in the target cell 116, such as e.g. Example 4, and wherein the trigger for downlink data forwarding is adapted to be obtained from the target access node 112 when the criterion is fulfilled, which trigger e.g. e.g. is adapted to comprise an indication to the source access node 111 to forward the data packets.

Embodiment 23. The access node according to any of the embodiments 17-18, wherein the criterion for data forwarding is adapted to be fulfilled when any one out of.

the source access node 111 fails to receive ACKs from the UE 120 in the source cell 115 for a first certain specified time or, the source access node 111 receives NACK for a second certain specified time, such as e.g. Example 5, and wherein the trigger for downlink data forwarding is adapted to be obtained in the source access node 111 when the criterion for data forwarding is fulfilled.

Embodiment 24. The access node according to any of the embodiments 17-18, wherein the criterion for data forwarding is adapted to be fulfilled when any one out of:

when the source access node 111 receives a message such as a HO Request Ack providing target access node 112 with user plane tunnel endpoints, or, when the source access node 111 sends a message such as a Handover Command to the UE 120, or, when the source access node 111 sends a message such as an SN Status Transfer to the target access node 112 after sending a message such as a HO Command, such as e.g. Example 6, and wherein the trigger for downlink data forwarding is adapted to be obtained in the source access node 111 when the criterion for data forwarding is fulfilled.

Embodiment 25. The access node according to any of the embodiments 17-24, wherein the source access node 111 and the target access node 112 are adapted to be the same network node.

Embodiment 26. A User Equipment, UE, 120 configured e.g. for handling a handover of from a source cell 115 e.g. served by the source access node 111, to a target cell 116 e.g. served by a target access node 112 in a wireless communications network 100, the UE 120 being adapted to comprise any one or more out of:

detect that a criterion for data forwarding is fulfilled, e.g. by means of a detecting unit in the UE 120, and transmit a trigger to the source access node 111 upon detecting that the criterion is fulfilled, which trigger triggers the source access node 111 to initiate downlink data forwarding to the UE 120 via the target access node 112, e.g. by means of a transmitting unit in the UE 120.

Embodiment 27. The UE 120 according to embodiment 26, wherein the criterion for data forwarding is adapted to be fulfilled when the UE 120 receives a message such as e.g. a RAR message from the target access node 112 such as e.g. Example 3.

Embodiment 28. The UE 120 according to embodiment 26, wherein the criterion for data forwarding is adapted to be fulfilled when the UE 120 sends a message to the target access node 112, such as e.g. Example 2.

Below, see variants of embodiments 17-28.

Embodiment 17. An access node, such as e.g. a source access node 111, configured e.g. for performing data forwarding at handover of a UE 120 from a source cell 115 e.g. served by the source access node 111, to a target cell 116 e.g. served by a target access node 112 in a wireless communications network 100, the access node such as e.g. a source access node 111, the access node comprising a processor and a memory containing instructions executable by the processor whereby the access node is configured to:

when a criterion for data forwarding is fulfilled, obtain a trigger for downlink data forwarding, e.g. by means of an obtaining unit in the access node, and when receiving the trigger, initiate downlink data forwarding to the UE 120 via the target access node 112, e.g. by means of an initiating unit in the access node.

Embodiment 18. The access node according to embodiment 17, where the trigger for downlink data forwarding is adapted to be obtained according to any one out of: from the UE 120, from the target access node 112 or in the source access node 111.

Embodiment 19. The access node according to any of the embodiments 17-18, wherein the criterion for data forwarding is adapted to be fulfilled when the UE 120 successfully receives a response message such as e.g. a RAR, from the target access node 112, such as e.g. Example 1, and wherein the trigger for downlink data forwarding is adapted to be obtained from the UE 120 when the criterion is fulfilled, which trigger e.g. is adapted to comprise an indication to the source access node 111 that the UE 120 has received the RAR from the target access node 112.

Embodiment 20. The access node according to any of the embodiments 17-18, wherein the criterion for data forwarding is adapted to be fulfilled when the UE 120 sends a message such as e.g. a RRC reconfiguration complete message to the target access node 112, such as e.g. Example 2, and wherein the trigger for downlink data forwarding is adapted to be obtained from the UE 120 when the criterion is fulfilled, which trigger e.g. e.g. is adapted to comprise an indication to the source access node 111 that the UE 120 has transmitted the message such as the RRC reconfiguration complete message.

Embodiment 21. The access node according to any of the embodiments 17-18, wherein the criterion for data forwarding is adapted to be fulfilled when the target access node 112 sends a response message such as the RAR to the UE 120 in the target cell 116, such as e.g. Example 3, and wherein the trigger for downlink data forwarding is adapted to be obtained from the target access node 112 when the criterion is fulfilled, which trigger e.g. e.g. is adapted to comprise, an indication to the source access node 111 to forward the data packets.

Embodiment 22. The access node according to any of the embodiments 17-18, wherein the criterion for data forwarding is adapted to be fulfilled when the target access node 112 receives the RRC reconfiguration complete message from the UE 120 in the target cell 116, such as e.g. Example 4, and wherein the trigger for downlink data forwarding is adapted to be obtained from the target access node 112 when the criterion is fulfilled, which trigger e.g. e.g. is adapted to comprise an indication to the source access node 111 to forward the data packets.

Embodiment 23. The access node according to any of the embodiments 17-18, wherein the criterion for data forwarding is adapted to be fulfilled when any one out of.

the source access node 111 fails to receive ACKs from the UE 120 in the source cell 115 for a first certain specified time or, the source access node 111 receives NACK for a second certain specified time, such as e.g. Example 5, and wherein the trigger for downlink data forwarding is adapted to be obtained in the source access node 111 when the criterion for data forwarding is fulfilled.

Embodiment 24. The access node according to any of the embodiments 17-18, wherein the criterion for data forwarding is adapted to be fulfilled when any one out of:

when the source access node 111 receives a message such as a HO Request Ack providing target access node 112 with user plane tunnel endpoints, or, when the source access node 111 sends a message such as a Handover Command to the UE 120, or, when the source access node 111 sends a message such as an SN Status Transfer to the target access node 112 after sending a message such as a HO Command, such as e.g. Example 6, and wherein the trigger for downlink data forwarding is adapted to be obtained in the source access node 111 when the criterion for data forwarding is fulfilled.

Embodiment 25. The access node according to any of the embodiments 17-24, wherein the source access node 111 and the target access node 112 are adapted to be the same network node.

Embodiment 26. A User Equipment, UE, 120 configured e.g. for handling a handover of from a source cell 115 e.g. served by the source access node 111, to a target cell 116 e.g. served by a target access node 112 in a wireless communications network 100, the UE 120 comprising a processor and a memory containing instructions executable by the processor whereby the UE 120 is configured to:

detect that a criterion for data forwarding is fulfilled, e.g. by means of a detecting unit in the UE 120, and transmit a trigger to the source access node 111 upon detecting that the criterion is fulfilled, which trigger triggers the source access node 111 to initiate downlink data forwarding to the UE 120 via the target access node 112, e.g. by means of a transmitting unit in the UE 120.

Embodiment 27. The UE 120 according to embodiment 26, wherein the criterion for data forwarding is adapted to be fulfilled when the UE 120 receives a message such as e.g. a RAR message from the target access node 112 such as e.g. Example 3.

Embodiment 28. The UE 120 according to embodiment 26, wherein the criterion for data forwarding is adapted to be fulfilled when the UE 120 sends a message to the target access node 112, such as e.g. Example 2.

Below, some further examples 1-14 of embodiments herein are described.

1. A method in the access node to perform data forwarding at handover of the UE 120 from the source access node 111 to the target access node 112, comprising:

Detecting that a criterion for data forwarding is fulfilled

Obtaining, in a source access node 111, a trigger for data forwarding

Initiating downlink data forwarding to the UE 120 via a target access node 112.

2. A method in the UE 120 to perform handover from the source access node 111 to the target access node 112, comprising:

a. Detecting that a criterion for data forwarding is fulfilled b. Transmitting a message to the source access node 111 upon detecting.

3. The method in 2, where the criterion for data forwarding is fulfilled when the UE 120 receives a message from the target access node 112.

4. The method in 3, where the message is a random access response (embodiment 1).

5. The method in 2, where the criterion for data forwarding is fulfilled when the UE 120 sends a message to the target access node 112 (embodiment 2).

6. The method in 1, where the criterion is detected by the target access node 112.

7. The method in 6, where the criterion is when the target access node 112 transmits a message to the UE 120 a. As in 7, where the message is a random access response (embodiment 3).

8. The method in 6, where the criterion is when the target access node 112 receives a message from the UE a. As in 8, where the message is an RRC Connection Reconfiguration complete message (embodiment 4).

9. The method in 1, where the trigger criterion is detected by the source access node 111 (embodiments 5-6).

10. The method in 9, where the criterion is when the source access node 111 fails to receive ACKs from the UE (embodiment 5).

11. The method in 9, where the criterion is when the source access node 111 has received a message from the target access node 112 (embodiment 6)

a. As in 11 where the message is a HO Request Ack providing target access node 112 with user plane tunnel endpoints.

12. The method in 9, where the criterion is when the source access node 111 has sent a message to the UE (embodiment 6)

a. As in 12, where the message is Handover Command b. As in 12, where the message is RRC Connection Reconfiguration.

13. The method in 1, where obtaining comprises a message received from the UE 120.
14. The method in 1, where obtaining comprises a message received from the target access node 112.

With reference to FIG. 16, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as the source and target access node 111, 112, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 16 as a whole enables connectivity between one of the connected UEs 3291, 3292 such as e.g. the UE 120, and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230. Example implementations, in accordance with an embodiment, of the UE, base station and host computer discussed in the preceding paragraphs will now be described with reference to FIG. 17. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 17) served by the base station 3320. The communication interface 3326 may be configured to facilitate a connection 3360 to the host computer 3310. The connection 3360 may be direct or it may pass through a core network (not shown in FIG. 17) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 17 may be identical to the host computer 3230, one of the base stations 3212a, 3212b, 3212c and one of the UEs 3291, 3292 of FIG. 16, respectively. This is to say, the inner workings of these entities may be as shown in FIG. 17 and independently, the surrounding network topology may be that of FIG. 16.

Figure 17:
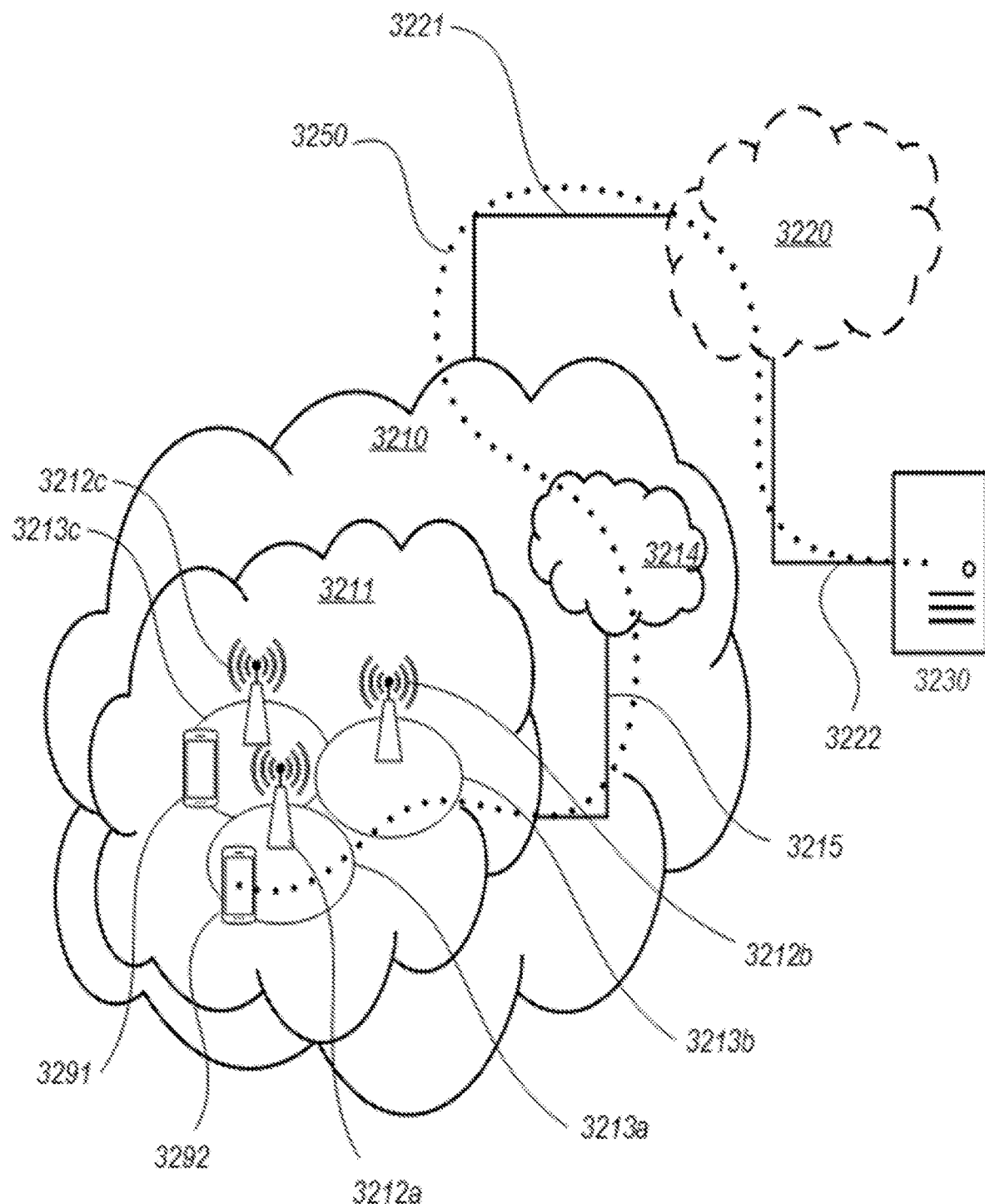
FIG. 17 schematically illustrates a telecommunication network connected via an intermediate network to a host computer.

In FIG. 17, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption, and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 18:
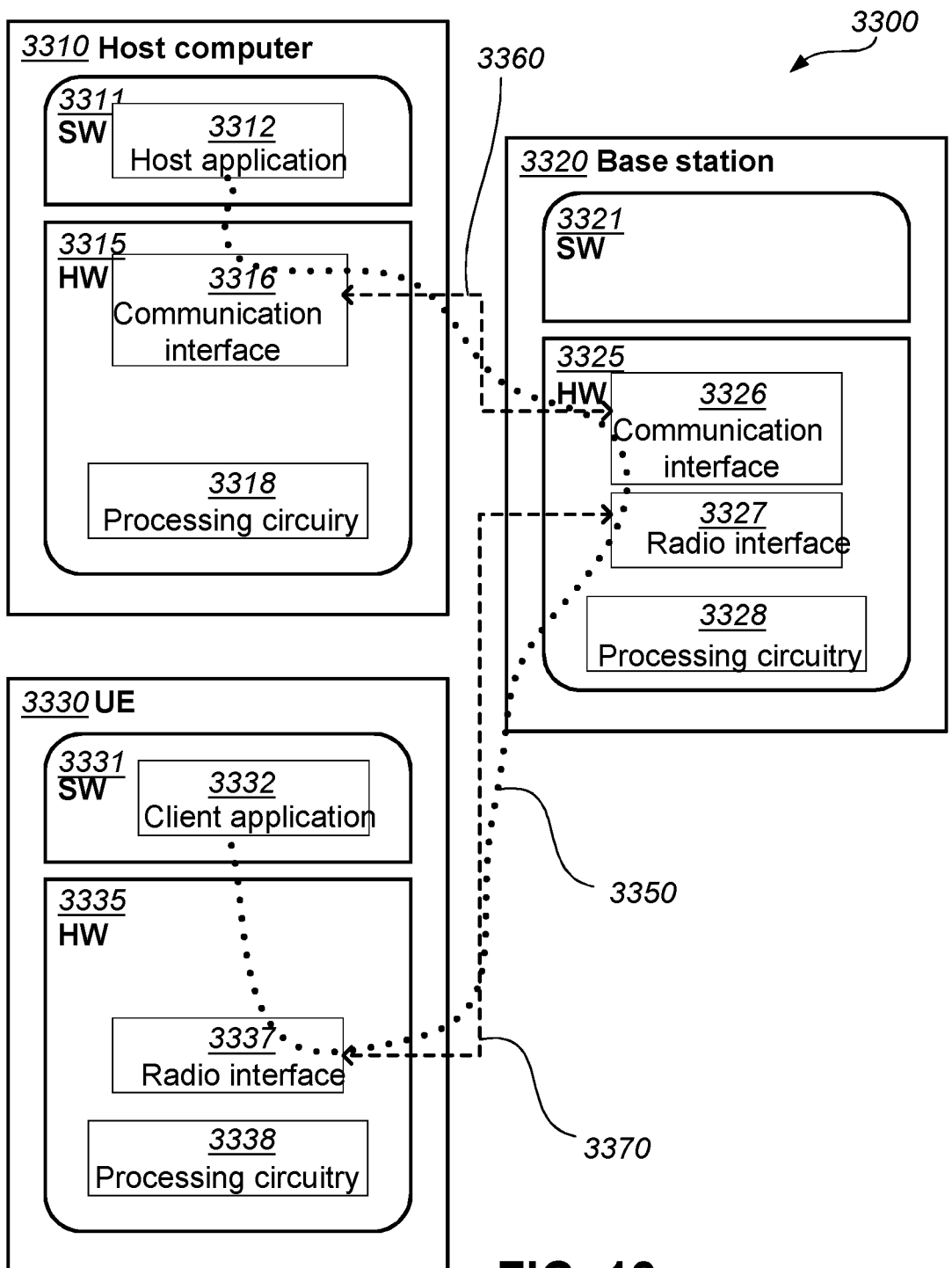
FIG. 18 is a generalized block diagram of a host computer communicating via a base station with a user equipment over a partially wireless connection.

FIG. 18 is a flowchart illustrating a method implemented in a communication system, in accordance with one embodiment. The communication system includes a host computer, a base station such as a AP STA, and a UE such as a Non-AP STA which may be those described with reference to FIG. 16 and FIG. 17. For simplicity of the present disclosure, only drawing references to FIG. 18 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 19 is a flowchart illustrating a method implemented in a communication system, in accordance with one embodiment. The communication system includes a host computer, a base station such as a AP STA, and a UE such as a Non-AP STA which may be those described with reference to FIG. 16 and FIG. 17. For simplicity of the present disclosure, only drawing references to FIG. 19 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 20 is a flowchart illustrating a method implemented in a communication system, in accordance with one embodiment. The communication system includes a host computer, a base station such as a AP STA, and a UE such as a Non-AP STA which may be those described with reference to FIG. 16 and FIG. 17. For simplicity of the present disclosure, only drawing references to FIG. 20 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 21:
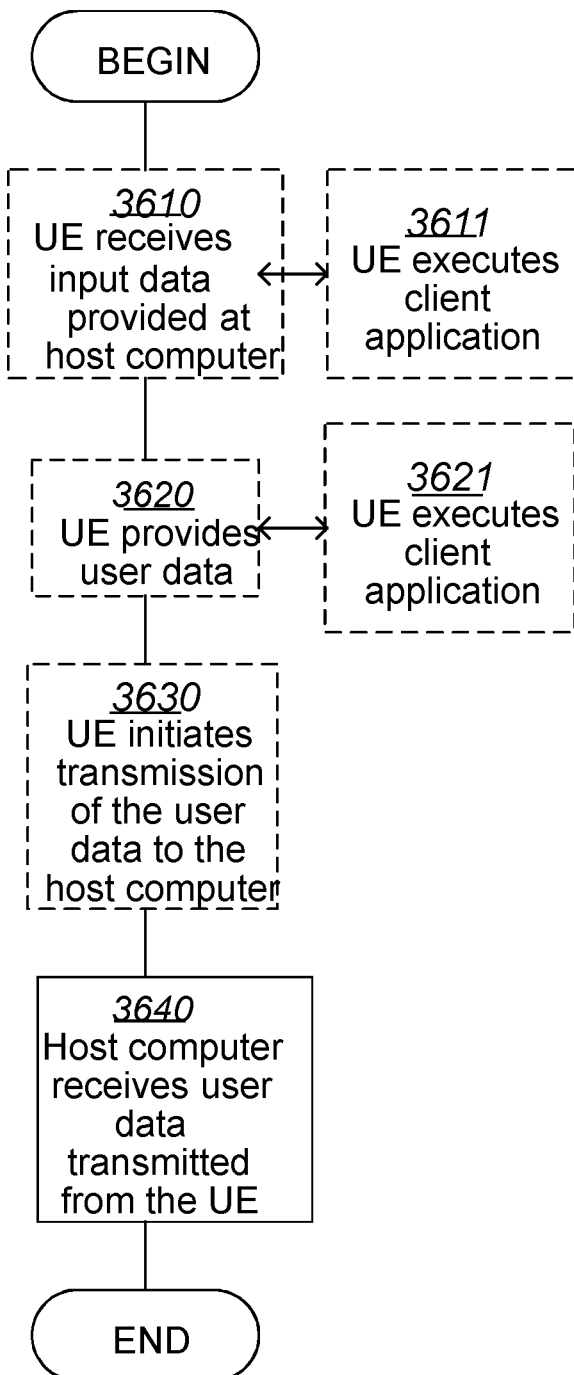
Figure 22:
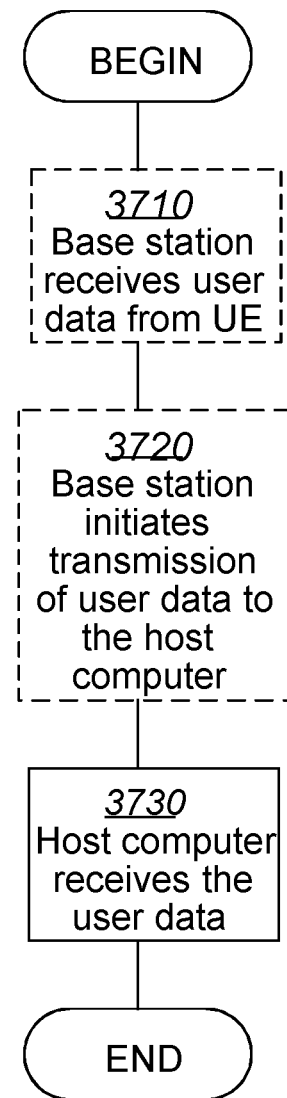

FIG. 21 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 21 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

ABBREVIATIONS

| Abbreviation | Explanation |
| --- | --- |
| 5GS | 5G System |
| 5GC | 5G Core network |
| AMF | Access and Mobility Management Function |
| ARQ | Automatic Repeat Request |
| CHO | Conditional Handover |
| DL | Downlink |
| eNB | Evolved Node B |
| E-UTRAN | Evolved Universal Terrestrial Access Network |
| EPC | Evolved Packet Core network |
| gNB | 5G Node B |
| HARQ | Hybrid Automatic Repeat Request |
| HO | Handover |
| LTE | Long-term Evolution |
| MBB | Make-before-break |
| NCC | Next Hop Chaining Counter |
| NG-RAN | Next Generation Radio Access Network |
| NR | New Radio |
| PDCP | Packet Data Convergence Protocol |
| RA | Random Access |
| RAR | Random Access Response |
| RLC | Radio Link Control |
| RRC | Radio Resource Control |
| Rx | Receive |
| SN | Sequence Number |
| Tx | Transmit |
| UE | User Equipment |
| UL | Uplink |
| UPF | User Plane Function |
| X2AP | X2 Application Protocol (The inter-eNB control plane protocol over the X2 interface.) |
| XnAP | Xn Application Protocol (The inter-gNB control plane protocol over the Xn interface.) |

The invention claimed is:

1. A method performed by a source access node for performing data forwarding at handover of a UE from a source cell served by the source access node, to a target cell served by a target access node in a wireless communications network, the method comprising:
   obtaining a trigger for downlink data forwarding in the source access node, the trigger being obtained from one or both of the UE and the target access node, the trigger comprising an indication that the target access node transmitted a random access response, RAR, to the UE; and
   when obtaining the trigger, initiating downlink data forwarding to the UE via the target access node.

2. The method according to claim 1, wherein the source access node and the target access node are the same network node.

3. A method performed by a User Equipment, UE, for handling a handover of from a source cell served by a source access node, to a target cell served by a target access node in a wireless communications network, the method comprising:
   receiving a random access response, RAR, from the target access node; and
   transmitting a trigger to the source access node upon receiving the RAR, which trigger triggers the source access node to initiate downlink data forwarding to the UE via the target access node, the trigger comprising an indication that the target access node transmitted the RAR to the UE.

4. A source access node configured to perform data forwarding at handover of a UE from a source cell served by the source access node to a target cell served by a target access node in a wireless communications network, the source access node comprising processing circuitry configured to:
   obtain a trigger for downlink data forwarding in the source access node, the trigger being obtained from one or both of the UE and the target access node, the trigger comprising an indication that the target access node transmitted a random access response, RAR, to the UE; and
   when obtaining the trigger, initiate downlink data forwarding to the UE via the target access node.

5. The access node according to claim 4, wherein the criterion for data forwarding is adapted to be fulfilled when any one of:
   the source access node fails to receive an Acknowledgement, ACK, from the UE in the source cell for a first certain specified time; and
   the source access node receives a Negative Acknowledgement, NACK, from the UE for a second certain specified time; and
   wherein the trigger for downlink data forwarding is adapted to be obtained in the source access node when the criterion for data forwarding is fulfilled.

6. A User Equipment, UE, configured to handle a handover of from a source cell served by a source access node to a target cell served by a target access node in a wireless communications network, the UE comprising processing circuitry configured to:
   receive a random access response, RAR, from the target access node; and
   transmit a trigger to the source access node upon receiving the RAR, which trigger triggers the source access node to initiate downlink data forwarding to the UE via the target access node, the trigger comprising an indication that the target access node transmitted the RAR to the UE.

* * * * *